(12) United States Patent
Yeung et al.

(10) Patent No.: US 11,994,014 B2
(45) Date of Patent: *May 28, 2024

(54) METHODS, SYSTEMS, AND DEVICES TO ENHANCE FRACTURING FLUID DELIVERY TO SUBSURFACE FORMATIONS DURING HIGH-PRESSURE FRACTURING OPERATIONS

(71) Applicant: BJ Energy Solutions, LLC, Houston, TX (US)

(72) Inventors: Tony Yeung, Houston, TX (US); Nicholas Tew, Houston, TX (US); William Nieuwenburg, Houston, TX (US)

(73) Assignee: BJ Energy Solutions, LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,201

(22) Filed: Jan. 25, 2023

(65) Prior Publication Data

US 2023/0160290 A1 May 25, 2023

Related U.S. Application Data

(63) Continuation of application No. 17/670,694, filed on Feb. 14, 2022, now Pat. No. 11,608,727, which is a
(Continued)

(51) Int. Cl.
*E21B 43/26* (2006.01)
*E21B 43/267* (2006.01)
(Continued)

(52) U.S. Cl.
CPC ........ *E21B 43/2607* (2020.05); *E21B 43/267* (2013.01); *F16B 7/0426* (2013.01); *E21B 21/062* (2013.01)

(58) Field of Classification Search
CPC .............................. E21B 43/2607; F04B 23/04
See application file for complete search history.

(56) References Cited

U.S. PATENT DOCUMENTS 1,716,049 A 6/1929 Greve
1,726,633 A 9/1929 Smith
(Continued)

FOREIGN PATENT DOCUMENTS

AU 9609498 7/1999
AU 737970 9/2001
(Continued)

OTHER PUBLICATIONS

US 11,555,493 B2, 01/2023, Chang et al. (withdrawn)
(Continued)

*Primary Examiner* — Shane Bomar
(74) *Attorney, Agent, or Firm* — Norton Rose Fulbright US LLP

(57) ABSTRACT

Methods, systems, and devices to enhance fracturing fluid delivery to subsurface formations to enhance hydrocarbon production from the subsurface formations may include providing a manifold coupling having a manifold coupling passage with a manifold coupling axis. The manifold coupling may include a first inlet passage positioned to provide fluid flow between a first fracturing fluid output and the manifold coupling passage, and a second inlet passage positioned opposite the first inlet passage to provide fluid flow between a second fracturing fluid output and the manifold coupling passage. The first inlet passage may have a first inlet passage cross-section at least partially defining a first inlet axis extending transverse relative to the manifold coupling axis. The second inlet passage may have a second inlet passage cross-section at least partially defining a sec-
(Continued)

ond inlet axis extending transverse relative to the manifold coupling axis and not being co-linear with the first inlet axis.

25 Claims, 9 Drawing Sheets

Related U.S. Application Data continuation of application No. 17/509,292, filed on Oct. 25, 2021, now Pat. No. 11,365,615, which is a continuation of application No. 17/509,252, filed on Oct. 25, 2021, now Pat. No. 11,255,175, which is a continuation of application No. 17/303,150, filed on May 21, 2021, now Pat. No. 11,193,361, which is a continuation of application No. 17/303,146, filed on May 21, 2021, now Pat. No. 11,193,360.

(60) Provisional application No. 63/201,721, filed on May 11, 2021, provisional application No. 62/705,850, filed on Jul. 17, 2020.

(51) Int. Cl.
*F16B 7/04* (2006.01)
*E21B 21/06* (2006.01)

(56) References Cited

U.S. PATENT DOCUMENTS

| | | | |
|---|---|---|---|
| 2,178,662 A | 11/1939 | Lars |
| 2,427,638 A | 9/1947 | Vilter |
| 2,498,229 A | 2/1950 | Adler |
| 2,535,703 A | 12/1950 | Smith et al. |
| 2,572,711 A | 10/1951 | Fischer |
| 2,820,341 A | 1/1958 | Amann |
| 2,868,004 A | 1/1959 | Runde |
| 2,940,377 A | 6/1960 | Darnell et al. |
| 2,947,141 A | 8/1960 | Russ |
| 2,956,738 A | 10/1960 | Rosenschold |
| 3,068,796 A | 12/1962 | Pfluger et al. |
| 3,191,517 A | 6/1965 | Solzman |
| 3,257,031 A | 6/1966 | Dietz |
| 3,274,768 A | 9/1966 | Klein |
| 3,378,074 A | 4/1968 | Kiel |
| 3,382,671 A | 5/1968 | Ehni, III |
| 3,401,873 A | 9/1968 | Privon |
| 3,463,612 A | 8/1969 | Whitsel |
| 3,496,880 A | 2/1970 | Wolff |
| 3,550,696 A | 12/1970 | Kenneday |
| 3,560,053 A | 2/1971 | Ortloff |
| 3,586,459 A | 6/1971 | Zerlauth |
| 3,632,222 A | 1/1972 | Cronstedt |
| 3,656,582 A | 4/1972 | Alcock |
| 3,667,868 A | 6/1972 | Brunner |
| 3,692,434 A | 9/1972 | Schnear |
| 3,739,872 A | 6/1973 | McNair |
| 3,757,581 A | 9/1973 | Mankin |
| 3,759,063 A | 9/1973 | Bendall |
| 3,765,173 A | 10/1973 | Harris |
| 3,771,916 A | 11/1973 | Flanigan et al. |
| 3,773,438 A | 11/1973 | Hall et al. |
| 3,781,135 A | 12/1973 | Nickell |
| 3,786,835 A | 1/1974 | Finger |
| 3,791,682 A | 2/1974 | Mitchell |
| 3,796,045 A | 3/1974 | Foster |
| 3,814,549 A | 6/1974 | Cronstedt |
| 3,820,922 A | 6/1974 | Buse et al. |
| 3,847,511 A | 11/1974 | Cole |
| 3,866,108 A | 2/1975 | Yannone |
| 3,875,380 A | 4/1975 | Rankin |
| 3,963,372 A | 6/1976 | McLain et al. |
| 4,010,613 A | 3/1977 | McInerney |
| 4,019,477 A | 4/1977 | Overton |
| 4,031,407 A | 6/1977 | Reed |
| 4,050,862 A | 9/1977 | Buse |
| 4,059,045 A | 11/1977 | McClain |
| 4,086,976 A | 5/1978 | Holm et al. |
| 4,117,342 A | 9/1978 | Melley, Jr. |
| 4,173,121 A | 11/1979 | Yu |
| 4,204,808 A | 5/1980 | Reese et al. |
| 4,209,079 A | 6/1980 | Marchal et al. |
| 4,209,979 A | 7/1980 | Woodhouse et al. |
| 4,222,229 A | 9/1980 | Uram |
| 4,239,396 A * | 12/1980 | Arribau ............... E21B 43/2607 366/65 |
| 4,269,569 A | 5/1981 | Hoover |
| 4,311,395 A | 1/1982 | Douthitt et al. |
| 4,330,237 A | 5/1982 | Battah |
| 4,341,508 A | 7/1982 | Rambin, Jr. |
| 4,357,027 A | 11/1982 | Zeitlow |
| 4,383,478 A | 5/1983 | Jones |
| 4,402,504 A | 9/1983 | Christian |
| 4,430,047 A | 2/1984 | Ilg |
| 4,442,665 A | 4/1984 | Fick |
| 4,457,325 A | 7/1984 | Green |
| 4,470,771 A | 9/1984 | Hall et al. |
| 4,483,684 A | 11/1984 | Black |
| 4,505,650 A | 3/1985 | Hannett et al. |
| 4,574,880 A | 3/1986 | Handke |
| 4,584,654 A | 4/1986 | Crane |
| 4,620,330 A | 11/1986 | Izzi, Sr. |
| 4,672,813 A | 6/1987 | David |
| 4,754,607 A | 7/1988 | Mackay |
| 4,782,244 A | 11/1988 | Wakimoto |
| 4,796,777 A | 1/1989 | Keller |
| 4,869,209 A | 9/1989 | Young |
| 4,913,625 A | 4/1990 | Gerlowski |
| 4,983,259 A | 1/1991 | Duncan |
| 4,990,058 A | 2/1991 | Eslinger |
| 5,032,065 A | 7/1991 | Yamamuro |
| 5,135,361 A | 8/1992 | Dion |
| 5,167,493 A | 12/1992 | Kobari |
| 5,245,970 A | 9/1993 | Iwaszkiewicz et al. |
| 5,291,842 A | 3/1994 | Sallstrom et al. |
| 5,326,231 A | 7/1994 | Pandeya |
| 5,362,219 A | 11/1994 | Paul et al. |
| 5,511,956 A | 4/1996 | Hasegawa |
| 5,537,813 A | 7/1996 | Davis et al. |
| 5,553,514 A | 9/1996 | Walkowc |
| 5,560,195 A | 10/1996 | Anderson et al. |
| 5,586,444 A | 12/1996 | Fung |
| 5,622,245 A | 4/1997 | Reik |
| 5,626,103 A | 5/1997 | Haws et al. |
| 5,634,777 A | 6/1997 | Albertin |
| 5,651,400 A | 7/1997 | Corts et al. |
| 5,678,460 A | 10/1997 | Walkowc |
| 5,717,172 A | 2/1998 | Griffin, Jr. et al. |
| 5,720,598 A | 2/1998 | de Chizzelle |
| 5,761,084 A | 6/1998 | Edwards |
| 5,811,676 A | 9/1998 | Spalding et al. |
| 5,839,888 A | 11/1998 | Harrison |
| 5,846,062 A | 12/1998 | Yanagisawa et al. |
| 5,875,744 A | 3/1999 | Vallejos |
| 5,983,962 A | 11/1999 | Gerardot |
| 5,992,944 A | 11/1999 | Hara |
| 6,041,856 A | 3/2000 | Thrasher et al. |
| 6,050,080 A | 4/2000 | Horner |
| 6,067,962 A | 5/2000 | Bartley et al. |
| 6,071,188 A | 6/2000 | O'Neill et al. |
| 6,074,170 A | 6/2000 | Bert et al. |
| 6,123,751 A | 9/2000 | Nelson et al. |
| 6,129,335 A | 10/2000 | Yokogi |
| 6,145,318 A | 11/2000 | Kaplan et al. |
| 6,230,481 B1 | 5/2001 | Jahr |
| 6,279,309 B1 | 8/2001 | Lawlor, II et al. |
| 6,321,860 B1 | 11/2001 | Reddoch |
| 6,334,746 B1 | 1/2002 | Nguyen et al. |
| 6,401,472 B2 | 6/2002 | Pollrich |
| 6,530,224 B1 | 3/2003 | Conchieri |
| 6,543,395 B2 | 4/2003 | Green |
| 6,655,922 B1 | 12/2003 | Flek |
| 6,669,453 B1 | 12/2003 | Breeden |
| 6,765,304 B2 | 7/2004 | Baten et al. |

(56) References Cited

U.S. PATENT DOCUMENTS

| | | |
|---|---|---|
| 6,786,051 B2 | 9/2004 | Kristich et al. |
| 6,832,900 B2 | 12/2004 | Leu |
| 6,851,514 B2 | 2/2005 | Han et al. |
| 6,859,740 B2 | 2/2005 | Stephenson et al. |
| 6,901,735 B2 | 6/2005 | Lohn |
| 6,962,057 B2 | 11/2005 | Kurokawa et al. |
| 7,007,966 B2 | 3/2006 | Campion |
| 7,047,747 B2 | 5/2006 | Tanaka |
| 7,065,953 B1 | 6/2006 | Kopko |
| 7,143,016 B1 | 11/2006 | Discenzo et al. |
| 7,222,015 B2 | 5/2007 | Davis et al. |
| 7,281,519 B2 | 10/2007 | Schroeder |
| 7,388,303 B2 | 6/2008 | Seiver |
| 7,404,294 B2 | 7/2008 | Sundin |
| 7,442,239 B2 | 10/2008 | Armstrong et al. |
| 7,524,173 B2 | 4/2009 | Cummins |
| 7,545,130 B2 | 6/2009 | Latham |
| 7,552,903 B2 | 6/2009 | Dunn et al. |
| 7,563,076 B2 | 7/2009 | Brunet et al. |
| 7,563,413 B2 | 7/2009 | Naets et al. |
| 7,574,325 B2 | 8/2009 | Dykstra |
| 7,581,379 B2 | 9/2009 | Yoshida et al. |
| 7,594,424 B2 | 9/2009 | Fazekas |
| 7,614,239 B2 | 11/2009 | Herzog et al. |
| 7,627,416 B2 | 12/2009 | Batenburg et al. |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,779,961 B2 | 8/2010 | Matte |
| 7,789,452 B2 | 9/2010 | Dempsey et al. |
| 7,836,949 B2 | 11/2010 | Dykstra |
| 7,841,394 B2 | 11/2010 | McNeel et al. |
| 7,845,413 B2 | 12/2010 | Shampine et al. |
| 7,861,679 B2 | 1/2011 | Lemke et al. |
| 7,886,702 B2 | 2/2011 | Jerrell et al. |
| 7,900,724 B2 | 3/2011 | Promersberger et al. |
| 7,921,914 B2 | 4/2011 | Bruins et al. |
| 7,938,151 B2 | 5/2011 | Höckner |
| 7,955,056 B2 | 6/2011 | Pettersson |
| 7,980,357 B2 | 7/2011 | Edwards |
| 8,056,635 B2 | 11/2011 | Shampine et al. |
| 8,083,504 B2 | 12/2011 | Williams et al. |
| 8,099,942 B2 | 1/2012 | Alexander |
| 8,186,334 B2 | 5/2012 | Ooyama |
| 8,196,555 B2 | 6/2012 | Ikeda et al. |
| 8,202,354 B2 | 6/2012 | Iijima |
| 8,316,936 B2 | 11/2012 | Roddy et al. |
| 8,336,631 B2 | 12/2012 | Shampine et al. |
| 8,388,317 B2 | 3/2013 | Sung |
| 8,414,673 B2 | 4/2013 | Raje et al. |
| 8,469,826 B2 | 6/2013 | Brosowske |
| 8,500,215 B2 | 8/2013 | Gastauer |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,641,399 B2 | 2/2014 | Mucibabic |
| 8,656,990 B2 | 2/2014 | Kajaria et al. |
| 8,672,606 B2 | 3/2014 | Glynn et al. |
| 8,707,853 B1 | 4/2014 | Dille et al. |
| 8,708,667 B2 | 4/2014 | Collingborn |
| 8,714,253 B2 | 5/2014 | Sherwood et al. |
| 8,757,918 B2 | 6/2014 | Ramnarain et al. |
| 8,763,583 B2 | 7/2014 | Hofbauer et al. |
| 8,770,329 B2 | 7/2014 | Spitler |
| 8,784,081 B1 | 7/2014 | Blume |
| 8,789,601 B2 | 7/2014 | Broussard et al. |
| 8,794,307 B2 | 8/2014 | Coquilleau et al. |
| 8,801,394 B2 | 8/2014 | Anderson |
| 8,851,186 B2 | 10/2014 | Shampine et al. |
| 8,851,441 B2 | 10/2014 | Acuna et al. |
| 8,894,356 B2 | 11/2014 | Lafontaine et al. |
| 8,905,056 B2 | 12/2014 | Kendrick |
| 8,951,019 B2 | 2/2015 | Hains et al. |
| 8,973,560 B2 | 3/2015 | Krug |
| 8,997,904 B2 | 4/2015 | Cryer et al. |
| 9,011,111 B2 | 4/2015 | Lesko |
| 9,016,383 B2 | 4/2015 | Shampine et al. |
| 9,032,620 B2 | 5/2015 | Frassinelli et al. |
| 9,057,247 B2 | 6/2015 | Kumar et al. |
| 9,097,249 B2 | 8/2015 | Petersen |
| 9,103,193 B2 | 8/2015 | Coli et al. |
| 9,121,257 B2 | 9/2015 | Coli et al. |
| 9,140,110 B2 | 9/2015 | Coli et al. |
| 9,175,810 B2 | 11/2015 | Hains |
| 9,187,982 B2 | 11/2015 | Dehring et al. |
| 9,206,667 B2 | 12/2015 | Khvoshchev et al. |
| 9,212,643 B2 | 12/2015 | Deliyski |
| 9,222,346 B1 * | 12/2015 | Walls .................. E21B 43/2607 |
| 9,324,049 B2 | 4/2016 | Thomeer et al. |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,435,333 B2 | 9/2016 | McCoy et al. |
| 9,488,169 B2 | 11/2016 | Cochran et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,593,710 B2 | 3/2017 | Laimboeck et al. |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,656,762 B2 | 5/2017 | Kamath et al. |
| 9,689,316 B1 | 6/2017 | Crom |
| 9,695,808 B2 | 7/2017 | Giessbach et al. |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oering et al. |
| 9,845,730 B2 | 12/2017 | Betti et al. |
| 9,850,422 B2 | 12/2017 | Lestz et al. |
| 9,856,131 B1 | 1/2018 | Moffitt |
| 9,863,279 B2 | 1/2018 | Laing et al. |
| 9,869,305 B1 | 1/2018 | Crowe et al. |
| 9,871,406 B1 | 1/2018 | Churnock et al. |
| 9,879,609 B1 | 1/2018 | Crowe et al. |
| RE46,725 E | 2/2018 | Case et al. |
| 9,893,500 B2 | 2/2018 | Oehring et al. |
| 9,893,660 B2 | 2/2018 | Peterson et al. |
| 9,897,003 B2 | 2/2018 | Motakef et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,008,912 B2 | 6/2018 | Davey et al. |
| 10,018,096 B2 | 7/2018 | Wallimann et al. |
| 10,020,711 B2 | 7/2018 | Oehring et al. |
| 10,024,123 B2 | 7/2018 | Steffenhagen et al. |
| 10,029,289 B2 | 7/2018 | Wendorski et al. |

(56) References Cited

U.S. PATENT DOCUMENTS

| | | |
|---|---|---|
| 10,030,579 B2 | 7/2018 | Austin et al. |
| 10,036,238 B2 | 7/2018 | Oehring |
| 10,040,541 B2 | 8/2018 | Wilson et al. |
| 10,060,293 B2 | 8/2018 | Del Bono |
| 10,060,349 B2 | 8/2018 | Álvarez et al. |
| 10,077,933 B2 | 9/2018 | Nelson et al. |
| 10,082,137 B2 | 9/2018 | Graham et al. |
| 10,094,366 B2 | 10/2018 | Marica |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,125,750 B2 | 11/2018 | Pfaff |
| 10,134,257 B2 | 11/2018 | Zhang et al. |
| 10,138,098 B2 | 11/2018 | Sorensen et al. |
| 10,151,244 B2 | 12/2018 | Giancotti et al. |
| 10,161,423 B2 | 12/2018 | Rampen |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,288,519 B2 | 5/2019 | De La Cruz |
| 10,303,190 B2 | 5/2019 | Shock |
| 10,305,350 B2 | 5/2019 | Johnson et al. |
| 10,316,832 B2 | 6/2019 | Byrne |
| 10,317,875 B2 | 6/2019 | Pandurangan |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,478,753 B1* | 11/2019 | Elms ............... E21B 43/26 |
| 10,526,882 B2 | 1/2020 | Oehring et al. |
| 10,563,649 B2 | 2/2020 | Zhang et al. |
| 10,577,910 B2 | 3/2020 | Stephenson |
| 10,584,645 B2 | 3/2020 | Nakagawa et al. |
| 10,590,867 B2 | 3/2020 | Thomassin et al. |
| 10,598,258 B2 | 3/2020 | Oehring et al. |
| 10,610,842 B2 | 4/2020 | Chong |
| 10,662,749 B1 | 5/2020 | Hill et al. |
| 10,711,787 B1 | 7/2020 | Darley |
| 10,738,580 B2 | 8/2020 | Fischer et al. |
| 10,753,153 B1 | 8/2020 | Fischer et al. |
| 10,753,165 B1 | 8/2020 | Fischer et al. |
| 10,760,556 B1 | 9/2020 | Crom et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,830,225 B2 | 11/2020 | Repaci |
| 10,859,203 B1 | 12/2020 | Cui et al. |
| 10,864,487 B1 | 12/2020 | Han et al. |
| 10,865,624 B1 | 12/2020 | Cui et al. |
| 10,865,631 B1 | 12/2020 | Zhang et al. |
| 10,870,093 B1 | 12/2020 | Zhong et al. |
| 10,871,045 B2 | 12/2020 | Fischer et al. |
| 10,895,202 B1 | 1/2021 | Yeung et al. |
| 10,900,475 B2 | 1/2021 | Weightman et al. |
| 10,907,459 B1 | 2/2021 | Yeung et al. |
| 10,927,774 B2 | 2/2021 | Cai et al. |
| 10,927,802 B2 | 2/2021 | Oehring |
| 10,954,770 B1 | 3/2021 | Yeung et al. |
| 10,954,855 B1 | 3/2021 | Ji et al. |
| 10,961,614 B1 | 3/2021 | Yeung et al. |
| 10,961,908 B1 | 3/2021 | Yeung et al. |
| 10,961,912 B1 | 3/2021 | Yeung et al. |
| 10,961,914 B1 | 3/2021 | Yeung et al. |
| 10,961,993 B1 | 3/2021 | Ji et al. |
| 10,961,995 B2 | 3/2021 | Mayorca |
| 10,892,596 B2 | 4/2021 | Yeung et al. |
| 10,968,837 B1 | 4/2021 | Yeung et al. |
| 10,982,523 B1* | 4/2021 | Hill ............... F16L 41/021 |
| 10,989,019 B2 | 4/2021 | Cai et al. |
| 10,989,180 B2 | 4/2021 | Yeung et al. |
| 10,995,564 B2 | 5/2021 | Miller et al. |
| 11,002,189 B2 | 5/2021 | Yeung et al. |
| 11,008,950 B2 | 5/2021 | Ethier et al. |
| 11,015,423 B1 | 5/2021 | Yeung et al. |
| 11,015,536 B2 | 5/2021 | Yeung et al. |
| 11,015,594 B2 | 5/2021 | Yeung et al. |
| 11,022,526 B1 | 6/2021 | Yeung et al. |
| 11,028,677 B1 | 6/2021 | Yeung et al. |
| 11,035,213 B2 | 6/2021 | Dusterhoft et al. |
| 11,035,214 B2 | 6/2021 | Cui et al. |
| 11,047,379 B1 | 6/2021 | Li et al. |
| 11,053,853 B2 | 7/2021 | Li et al. |
| 11,060,455 B1 | 7/2021 | Yeung et al. |
| 11,066,915 B1 | 7/2021 | Yeung et al. |
| 11,068,455 B2 | 7/2021 | Shabi et al. |
| 11,085,281 B1 | 8/2021 | Yeung et al. |
| 11,085,282 B2 | 8/2021 | Mazrooee et al. |
| 11,092,152 B2 | 8/2021 | Yeung et al. |
| 11,098,651 B1 | 8/2021 | Yeung et al. |
| 11,105,250 B1 | 8/2021 | Zhang et al. |
| 11,105,266 B2 | 8/2021 | Zhou et al. |
| 11,109,508 B1 | 8/2021 | Yeung et al. |
| 11,111,768 B1 | 9/2021 | Yeung et al. |
| 11,125,066 B1 | 9/2021 | Yeung et al. |
| 11,125,156 B2 | 9/2021 | Zhang et al. |
| 11,129,295 B1 | 9/2021 | Yeung et al. |
| 11,143,000 B2 | 10/2021 | Li et al. |
| 11,143,005 B2 | 10/2021 | Dusterhoft et al. |
| 11,143,006 B1 | 10/2021 | Zhang et al. |
| 11,149,533 B1 | 10/2021 | Yeung et al. |
| 11,149,726 B1 | 10/2021 | Yeung et al. |
| 11,156,159 B1 | 10/2021 | Yeung et al. |
| 11,168,681 B2 | 11/2021 | Boguski |
| 11,174,716 B1 | 11/2021 | Yeung et al. |
| 11,193,360 B1 | 12/2021 | Yeung et al. |
| 11,193,361 B1 | 12/2021 | Yeung et al. |
| 11,205,880 B1 | 12/2021 | Yeung et al. |
| 11,205,881 B2 | 12/2021 | Yeung et al. |
| 11,208,879 B1 | 12/2021 | Yeung et al. |
| 11,208,953 B1 | 12/2021 | Yeung et al. |
| 11,220,895 B1 | 1/2022 | Yeung et al. |
| 11,236,739 B2 | 2/2022 | Yeung et al. |
| 11,242,737 B2 | 2/2022 | Zhang et al. |
| 11,243,509 B2 | 2/2022 | Cai et al. |
| 11,251,650 B1 | 2/2022 | Liu et al. |
| 11,261,717 B2 | 3/2022 | Yeung et al. |
| 11,268,346 B2 | 3/2022 | Yeung et al. |
| 11,280,266 B2 | 3/2022 | Yeung et al. |
| 11,306,835 B1* | 4/2022 | Dille ............... G05D 7/0173 |
| RE49,083 E | 5/2022 | Case et al. |
| 11,339,638 B1 | 5/2022 | Yeung et al. |
| 11,346,200 B2 | 5/2022 | Cai et al. |
| 11,373,058 B2 | 6/2022 | Jaaskelainen et al. |
| RE49,140 E | 7/2022 | Case et al. |
| 11,377,943 B2 | 7/2022 | Kriebel et al. |
| RE49,155 E | 8/2022 | Case et al. |
| RE49,156 E | 8/2022 | Case et al. |
| 11,401,927 B2 | 8/2022 | Li et al. |
| 11,428,165 B2 | 8/2022 | Yeung et al. |
| 11,441,483 B2 | 9/2022 | Li et al. |
| 11,448,122 B2 | 9/2022 | Feng et al. |

(56) References Cited

U.S. PATENT DOCUMENTS

| | | |
|---|---|---|
| 11,466,680 B2 | 10/2022 | Yeung et al. |
| 11,480,040 B2 | 10/2022 | Han et al. |
| 11,492,887 B2 | 11/2022 | Cui et al. |
| 11,499,405 B2 | 11/2022 | Zhang et al. |
| 11,506,039 B2 | 11/2022 | Zhang et al. |
| 11,512,570 B2 | 11/2022 | Yeung |
| 11,519,395 B2 | 12/2022 | Zhang et al. |
| 11,519,405 B2 | 12/2022 | Deng et al. |
| 11,530,602 B2 | 12/2022 | Yeung et al. |
| 11,549,349 B2 | 1/2023 | Wang et al. |
| 11,555,390 B2 | 1/2023 | Cui et al. |
| 11,555,756 B2 | 1/2023 | Yeung et al. |
| 11,557,887 B2 | 1/2023 | Ji et al. |
| 11,560,779 B2 | 1/2023 | Mao et al. |
| 11,560,845 B2 | 1/2023 | Yeung et al. |
| 11,572,775 B2 | 2/2023 | Mao et al. |
| 11,575,249 B2 | 2/2023 | Ji et al. |
| 11,592,020 B2 | 2/2023 | Chang et al. |
| 11,596,047 B2 | 2/2023 | Liu et al. |
| 11,598,263 B2 | 3/2023 | Yeung et al. |
| 11,603,797 B2 | 3/2023 | Zhang et al. |
| 11,607,982 B2 | 3/2023 | Tian et al. |
| 11,608,726 B2 | 3/2023 | Zhang et al. |
| 11,624,326 B2 | 4/2023 | Yeung et al. |
| 11,629,583 B2 | 4/2023 | Yeung et al. |
| 11,629,589 B2 | 4/2023 | Lin et al. |
| 11,649,766 B1 | 5/2023 | Yeung et al. |
| 11,662,384 B2 | 5/2023 | Liu et al. |
| 11,668,173 B2 | 6/2023 | Zhang et al. |
| 11,668,289 B2 | 6/2023 | Chang et al. |
| 11,677,238 B2 | 6/2023 | Liu et al. |
| 2002/0126922 A1 | 9/2002 | Cheng et al. |
| 2002/0197176 A1 | 12/2002 | Kondo |
| 2003/0031568 A1 | 2/2003 | Stiefel |
| 2003/0061819 A1 | 4/2003 | Kuroki et al. |
| 2003/0161212 A1 | 8/2003 | Neal et al. |
| 2004/0016245 A1 | 1/2004 | Pierson |
| 2004/0074238 A1 | 4/2004 | Wantanabe et al. |
| 2004/0076526 A1 | 4/2004 | Fukano et al. |
| 2004/0187950 A1 | 9/2004 | Cohen et al. |
| 2004/0219040 A1 | 11/2004 | Kugelev et al. |
| 2005/0051322 A1 | 3/2005 | Speer |
| 2005/0056081 A1 | 3/2005 | Gocho |
| 2005/0139286 A1 | 6/2005 | Poulter |
| 2005/0196298 A1 | 9/2005 | Manning |
| 2005/0226754 A1 | 10/2005 | Orr et al. |
| 2005/0274134 A1 | 12/2005 | Ryu et al. |
| 2006/0061091 A1 | 3/2006 | Osterloh |
| 2006/0062914 A1* | 3/2006 | Garg ............... C23C 16/45578 118/723 R |
| 2006/0196251 A1 | 9/2006 | Richey |
| 2006/0211356 A1 | 9/2006 | Grassman |
| 2006/0228225 A1 | 10/2006 | Rogers |
| 2006/0260331 A1 | 11/2006 | Andreychuk |
| 2006/0272333 A1 | 12/2006 | Sundin |
| 2007/0029090 A1 | 2/2007 | Andreychuk et al. |
| 2007/0041848 A1 | 2/2007 | Wood et al. |
| 2007/0066406 A1 | 3/2007 | Keller et al. |
| 2007/0098580 A1 | 5/2007 | Petersen |
| 2007/0107981 A1 | 5/2007 | Sicotte |
| 2007/0125544 A1 | 6/2007 | Robinson et al. |
| 2007/0169543 A1 | 7/2007 | Fazekas |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0006089 A1 | 1/2008 | Adnan et al. |
| 2008/0098891 A1 | 5/2008 | Feher |
| 2008/0161974 A1 | 7/2008 | Alston |
| 2008/0212275 A1 | 9/2008 | Waryck et al. |
| 2008/0229757 A1 | 9/2008 | Alexander et al. |
| 2008/0264625 A1 | 10/2008 | Ochoa |
| 2008/0264649 A1 | 10/2008 | Crawford |
| 2008/0298982 A1 | 12/2008 | Pabst |
| 2009/0064685 A1 | 3/2009 | Busekros et al. |
| 2009/0068031 A1 | 3/2009 | Gambier et al. |
| 2009/0092510 A1 | 4/2009 | Williams et al. |
| 2009/0124191 A1 | 5/2009 | Van Becelaere et al. |
| 2009/0178412 A1 | 7/2009 | Spytek |
| 2009/0212630 A1 | 8/2009 | Flegel et al. |
| 2009/0249794 A1 | 10/2009 | Wilkes et al. |
| 2009/0252616 A1 | 10/2009 | Brunet et al. |
| 2009/0308602 A1 | 12/2009 | Bruins et al. |
| 2010/0019626 A1 | 1/2010 | Stout et al. |
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0041681 A1 | 2/2011 | Duerr |
| 2011/0052423 A1 | 3/2011 | Gambier et al. |
| 2011/0054704 A1 | 3/2011 | Karpman et al. |
| 2011/0085924 A1 | 4/2011 | Shampine et al. |
| 2011/0146244 A1 | 6/2011 | Farman et al. |
| 2011/0146246 A1 | 6/2011 | Farman et al. |
| 2011/0173991 A1 | 7/2011 | Dean |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0023973 A1 | 2/2012 | Mayorca |
| 2012/0048242 A1 | 3/2012 | Sumilla et al. |
| 2012/0085541 A1 | 4/2012 | Love et al. |
| 2012/0137699 A1 | 6/2012 | Montagne et al. |
| 2012/0179444 A1 | 7/2012 | Ganguly et al. |
| 2012/0192542 A1 | 8/2012 | Chillar et al. |
| 2012/0199001 A1 | 8/2012 | Chillar et al. |
| 2012/0204627 A1 | 8/2012 | Anderl et al. |
| 2012/0255734 A1 | 10/2012 | Coli et al. |
| 2012/0310509 A1 | 12/2012 | Pardo et al. |
| 2012/0324903 A1 | 12/2012 | Dewis et al. |
| 2013/0068307 A1 | 3/2013 | Hains et al. |
| 2013/0087045 A1 | 4/2013 | Sullivan et al. |
| 2013/0087945 A1 | 4/2013 | Kusters et al. |
| 2013/0134702 A1 | 5/2013 | Boraas et al. |
| 2013/0189915 A1 | 7/2013 | Hazard |
| 2013/0205798 A1 | 8/2013 | Kwok et al. |
| 2013/0233165 A1 | 9/2013 | Matzner et al. |
| 2013/0255953 A1 | 10/2013 | Tudor |
| 2013/0259707 A1 | 10/2013 | Yin |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0000668 A1 | 1/2014 | Lessard |
| 2014/0010671 A1 | 1/2014 | Cryer et al. |
| 2014/0013768 A1 | 1/2014 | Laing et al. |
| 2014/0032082 A1 | 1/2014 | Gehrke et al. |
| 2014/0044517 A1 | 2/2014 | Saha et al. |
| 2014/0048253 A1 | 2/2014 | Andreychuk |
| 2014/0090729 A1 | 4/2014 | Coulter et al. |
| 2014/0090742 A1 | 4/2014 | Coskrey et al. |
| 2014/0094105 A1 | 4/2014 | Lundh et al. |
| 2014/0095114 A1 | 4/2014 | Thomeer et al. |
| 2014/0095554 A1 | 4/2014 | Thomeer et al. |
| 2014/0123621 A1 | 5/2014 | Driessens et al. |
| 2014/0130422 A1 | 5/2014 | Laing et al. |
| 2014/0138079 A1 | 5/2014 | Broussard et al. |
| 2014/0144641 A1 | 5/2014 | Chandler |
| 2014/0147291 A1 | 5/2014 | Burnette |
| 2014/0158345 A1 | 6/2014 | Jang et al. |
| 2014/0174097 A1 | 6/2014 | Hammer et al. |
| 2014/0196459 A1 | 7/2014 | Futa et al. |
| 2014/0216736 A1 | 8/2014 | Leugemors et al. |
| 2014/0219824 A1 | 8/2014 | Burnette |
| 2014/0250845 A1 | 9/2014 | Jackson et al. |
| 2014/0251623 A1 | 9/2014 | Lestz et al. |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2014/0322050 A1 | 10/2014 | Marette et al. |
| 2015/0027730 A1 | 1/2015 | Hall et al. |
| 2015/0078924 A1 | 3/2015 | Zhang et al. |
| 2015/0101344 A1 | 4/2015 | Jarrier et al. |
| 2015/0114652 A1 | 4/2015 | Lestz et al. |
| 2015/0129210 A1 | 5/2015 | Chong et al. |
| 2015/0135659 A1 | 5/2015 | Jarrier et al. |

(56) References Cited

U.S. PATENT DOCUMENTS

| | | |
|---|---|---|
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0214816 A1 | 7/2015 | Raad |
| 2015/0217672 A1 | 8/2015 | Shampine et al. |
| 2015/0226140 A1 | 8/2015 | Zhang et al. |
| 2015/0252661 A1 | 9/2015 | Glass |
| 2015/0275891 A1 | 10/2015 | Chong et al. |
| 2015/0337730 A1 | 11/2015 | Kupiszewski et al. |
| 2015/0340864 A1 | 11/2015 | Compton |
| 2015/0345385 A1 | 12/2015 | Santini |
| 2015/0369351 A1 | 12/2015 | Hermann et al. |
| 2016/0032703 A1 | 2/2016 | Broussard et al. |
| 2016/0032836 A1 | 2/2016 | Hawkinson et al. |
| 2016/0076447 A1 | 3/2016 | Merlo et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0123185 A1 | 5/2016 | Le Pache et al. |
| 2016/0168979 A1 | 6/2016 | Zhang et al. |
| 2016/0177675 A1 | 6/2016 | Morris et al. |
| 2016/0177945 A1 | 6/2016 | Byrne et al. |
| 2016/0186671 A1 | 6/2016 | Austin et al. |
| 2016/0195082 A1* | 7/2016 | Wiegman ............... F04B 23/04 417/63 |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273328 A1 | 9/2016 | Oehring |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0045055 A1 | 2/2017 | Hoefel et al. |
| 2017/0052087 A1 | 2/2017 | Faqihi et al. |
| 2017/0074074 A1 | 3/2017 | Joseph et al. |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Lecerf et al. |
| 2017/0114625 A1 | 4/2017 | Norris et al. |
| 2017/0122310 A1 | 5/2017 | Ladron De Guevara |
| 2017/0131174 A1 | 5/2017 | Enev et al. |
| 2017/0145918 A1 | 5/2017 | Oehring et al. |
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226842 A1 | 8/2017 | Omont et al. |
| 2017/0226998 A1 | 8/2017 | Zhang et al. |
| 2017/0227002 A1 | 8/2017 | Mikulski et al. |
| 2017/0233103 A1 | 8/2017 | Teicholz et al. |
| 2017/0234165 A1 | 8/2017 | Kersey et al. |
| 2017/0234308 A1 | 8/2017 | Buckley |
| 2017/0241336 A1 | 8/2017 | Jones et al. |
| 2017/0241671 A1 | 8/2017 | Ahmad |
| 2017/0248034 A1 | 8/2017 | Dzieciol et al. |
| 2017/0248208 A1 | 8/2017 | Tamura |
| 2017/0248308 A1 | 8/2017 | Makarychev-Mikhailov et al. |
| 2017/0275149 A1 | 9/2017 | Schmidt |
| 2017/0288400 A1 | 10/2017 | Williams |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0306847 A1 | 10/2017 | Suciu et al. |
| 2017/0306936 A1 | 10/2017 | Dole |
| 2017/0322086 A1 | 11/2017 | Luharuka |
| 2017/0333086 A1 | 11/2017 | Jackson |
| 2017/0334448 A1 | 11/2017 | Schwunk |
| 2017/0335842 A1 | 11/2017 | Robinson et al. |
| 2017/0350471 A1 | 12/2017 | Steidl et al. |
| 2017/0356470 A1 | 12/2017 | Jaffrey |
| 2017/0370199 A1 | 12/2017 | Witkowski et al. |
| 2017/0370480 A1* | 12/2017 | Witkowski ............ F16K 31/126 |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |
| 2018/0058171 A1 | 3/2018 | Roesner et al. |
| 2018/0087499 A1 | 3/2018 | Zhang et al. |
| 2018/0087996 A1 | 3/2018 | De La Cruz |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0313456 A1 | 11/2018 | Bayyouk et al. |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1* | 1/2019 | Morris ..................... C09K 8/80 |
| 2019/0010793 A1 | 1/2019 | Hinderliter |
| 2019/0011051 A1* | 1/2019 | Yeung ................... F04B 1/0538 |
| 2019/0048993 A1 | 2/2019 | Akiyama et al. |
| 2019/0063263 A1 | 2/2019 | Davis et al. |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0088845 A1 | 3/2019 | Sugi et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0128288 A1 | 5/2019 | Konada et al. |
| 2019/0131607 A1 | 5/2019 | Gillette |
| 2019/0136677 A1 | 5/2019 | Shampine et al. |
| 2019/0153843 A1 | 5/2019 | Headrick |
| 2019/0153938 A1 | 5/2019 | Hammoud |
| 2019/0154020 A1 | 5/2019 | Glass |
| 2019/0155318 A1 | 5/2019 | Meunier |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |

(56) References Cited

U.S. PATENT DOCUMENTS

| | | |
|---|---|---|
| 2019/0204021 A1 | 7/2019 | Morris et al. |
| 2019/0211661 A1 | 7/2019 | Reckles et al. |
| 2019/0211814 A1 | 7/2019 | Weightman et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277279 A1 | 9/2019 | Byrne et al. |
| 2019/0277295 A1 | 9/2019 | Clyburn et al. |
| 2019/0309585 A1 | 10/2019 | Miller et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0337392 A1 | 11/2019 | Joshi et al. |
| 2019/0338762 A1 | 11/2019 | Curry et al. |
| 2019/0345920 A1 | 11/2019 | Surjaatmadja et al. |
| 2019/0353103 A1 | 11/2019 | Roberge |
| 2019/0356199 A1 | 11/2019 | Morris et al. |
| 2019/0376449 A1 | 12/2019 | Carrell |
| 2019/0383123 A1 | 12/2019 | Hinderliter |
| 2020/0003205 A1 | 1/2020 | Stokkevåg et al. |
| 2020/0011165 A1 | 1/2020 | George et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0072201 A1 | 3/2020 | Marica |
| 2020/0088202 A1 | 3/2020 | Sigmar et al. |
| 2020/0095854 A1 | 3/2020 | Hinderliter |
| 2020/0109610 A1 | 4/2020 | Husoy et al. |
| 2020/0109616 A1 | 4/2020 | Oehring et al. |
| 2020/0132058 A1 | 4/2020 | Mollatt |
| 2020/0141219 A1 | 5/2020 | Oehring et al. |
| 2020/0141326 A1 | 5/2020 | Redford et al. |
| 2020/0141907 A1 | 5/2020 | Meck et al. |
| 2020/0166026 A1 | 5/2020 | Marica |
| 2020/0206704 A1 | 7/2020 | Chong |
| 2020/0208733 A1 | 7/2020 | Kim |
| 2020/0223648 A1 | 7/2020 | Herman et al. |
| 2020/0224645 A1 | 7/2020 | Buckley |
| 2020/0232454 A1 | 7/2020 | Chretien et al. |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0291731 A1* | 9/2020 | Haiderer ............. E21B 43/2607 |
| 2020/0295574 A1 | 9/2020 | Batsch-Smith |
| 2020/0300050 A1 | 9/2020 | Oehring et al. |
| 2020/0309027 A1 | 10/2020 | Rytkonen |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0325791 A1 | 10/2020 | Himmelmann |
| 2020/0325893 A1* | 10/2020 | Kraige ................. E21B 33/068 |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340322 A1* | 10/2020 | Sizemore ................ F16K 3/24 |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0354928 A1 | 11/2020 | Wehler et al. |
| 2020/0355055 A1 | 11/2020 | Dusterhoft et al. |
| 2020/0362760 A1 | 11/2020 | Morenko et al. |
| 2020/0362764 A1 | 11/2020 | Saintignan et al. |
| 2020/0370394 A1 | 11/2020 | Cai et al. |
| 2020/0370408 A1 | 11/2020 | Cai et al. |
| 2020/0370429 A1 | 11/2020 | Cai et al. |
| 2020/0371490 A1 | 11/2020 | Cai et al. |
| 2020/0386169 A1 | 12/2020 | Hinderliter et al. |
| 2020/0386222 A1 | 12/2020 | Pham et al. |
| 2020/0388140 A1 | 12/2020 | Gomez et al. |
| 2020/0392826 A1 | 12/2020 | Cui et al. |
| 2020/0392827 A1 | 12/2020 | George et al. |
| 2020/0393088 A1* | 12/2020 | Sizemore ............ E21B 43/2607 |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0407625 A1 | 12/2020 | Stephenson |
| 2020/0408071 A1 | 12/2020 | Li et al. |
| 2020/0408144 A1 | 12/2020 | Feng et al. |
| 2020/0408147 A1 | 12/2020 | Zhang et al. |
| 2020/0408149 A1 | 12/2020 | Li et al. |
| 2021/0025324 A1 | 1/2021 | Morris et al. |
| 2021/0025383 A1 | 1/2021 | Bodishbaugh et al. |
| 2021/0032061 A1 | 2/2021 | Hinderliter et al. |
| 2021/0054727 A1* | 2/2021 | Floyd .................... E21B 17/05 |
| 2021/0071503 A1 | 3/2021 | Ogg et al. |
| 2021/0071574 A1 | 3/2021 | Feng et al. |
| 2021/0071579 A1 | 3/2021 | Li et al. |
| 2021/0071654 A1 | 3/2021 | Brunson |
| 2021/0071752 A1 | 3/2021 | Cui et al. |
| 2021/0079758 A1 | 3/2021 | Yeung et al. |
| 2021/0079851 A1 | 3/2021 | Yeung et al. |
| 2021/0086851 A1 | 3/2021 | Zhang et al. |
| 2021/0087883 A1 | 3/2021 | Zhang et al. |
| 2021/0087916 A1 | 3/2021 | Zhang et al. |
| 2021/0087925 A1 | 3/2021 | Heidari et al. |
| 2021/0087943 A1 | 3/2021 | Cui et al. |
| 2021/0088042 A1 | 3/2021 | Zhang et al. |
| 2021/0123425 A1 | 4/2021 | Cui et al. |
| 2021/0123434 A1 | 4/2021 | Cui et al. |
| 2021/0123435 A1 | 4/2021 | Cui et al. |
| 2021/0131409 A1 | 5/2021 | Cui et al. |
| 2021/0140416 A1 | 5/2021 | Buckley |
| 2021/0148208 A1 | 5/2021 | Thomas et al. |
| 2021/0156240 A1* | 5/2021 | Cicci ...................... F04B 23/04 |
| 2021/0156241 A1* | 5/2021 | Cook ...................... F04B 53/16 |
| 2021/0172282 A1 | 6/2021 | Wang et al. |
| 2021/0180517 A1 | 6/2021 | Zhou et al. |
| 2021/0190045 A1 | 6/2021 | Zhang et al. |
| 2021/0199110 A1 | 7/2021 | Albert et al. |
| 2021/0222690 A1 | 7/2021 | Beisel |
| 2021/0239112 A1 | 8/2021 | Buckley |
| 2021/0246774 A1 | 8/2021 | Cui et al. |
| 2021/0270261 A1 | 9/2021 | Zhang et al. |
| 2021/0270264 A1 | 9/2021 | Byrne |
| 2021/0285311 A1 | 9/2021 | Ji et al. |
| 2021/0285432 A1 | 9/2021 | Ji et al. |
| 2021/0301807 A1 | 9/2021 | Cui et al. |
| 2021/0306720 A1 | 9/2021 | Sandoval et al. |
| 2021/0308638 A1 | 10/2021 | Zhong et al. |
| 2021/0324718 A1* | 10/2021 | Anders ............... E21B 43/2607 |
| 2021/0348475 A1 | 11/2021 | Yeung et al. |
| 2021/0348476 A1 | 11/2021 | Yeung et al. |
| 2021/0348477 A1 | 11/2021 | Yeung et al. |
| 2021/0355927 A1 | 11/2021 | Jian et al. |
| 2021/0372394 A1 | 12/2021 | Bagulayan et al. |
| 2021/0372395 A1 | 12/2021 | Li et al. |
| 2021/0376413 A1 | 12/2021 | Asfha |
| 2021/0388760 A1 | 12/2021 | Feng et al. |
| 2022/0082007 A1 | 3/2022 | Zhang et al. |
| 2022/0090476 A1 | 3/2022 | Zhang et al. |
| 2022/0090477 A1 | 3/2022 | Zhang et al. |
| 2022/0090478 A1 | 3/2022 | Zhang et al. |
| 2022/0112892 A1 | 4/2022 | Cui et al. |
| 2022/0120262 A1 | 4/2022 | Ji et al. |
| 2022/0145740 A1 | 5/2022 | Yuan et al. |
| 2022/0154775 A1 | 5/2022 | Liu et al. |
| 2022/0155373 A1 | 5/2022 | Liu et al. |
| 2022/0162931 A1 | 5/2022 | Zhong et al. |
| 2022/0162991 A1 | 5/2022 | Zhang et al. |
| 2022/0181859 A1 | 6/2022 | Ji et al. |
| 2022/0186724 A1 | 6/2022 | Chang et al. |
| 2022/0213777 A1 | 7/2022 | Cui et al. |

(56) References Cited

U.S. PATENT DOCUMENTS

| | | |
|---|---|---|
| 2022/0220836 A1 | 7/2022 | Zhang et al. |
| 2022/0224087 A1 | 7/2022 | Ji et al. |
| 2022/0228468 A1 | 7/2022 | Cui et al. |
| 2022/0228469 A1 | 7/2022 | Zhang et al. |
| 2022/0235639 A1 | 7/2022 | Zhang et al. |
| 2022/0235640 A1 | 7/2022 | Mao et al. |
| 2022/0235641 A1 | 7/2022 | Zhang et al. |
| 2022/0235642 A1 | 7/2022 | Zhang et al. |
| 2022/0235802 A1 | 7/2022 | Jiang et al. |
| 2022/0242297 A1 | 8/2022 | Tian et al. |
| 2022/0243613 A1 | 8/2022 | Ji et al. |
| 2022/0243724 A1 | 8/2022 | Li et al. |
| 2022/0250000 A1 | 8/2022 | Zhang et al. |
| 2022/0255319 A1 | 8/2022 | Liu et al. |
| 2022/0258659 A1 | 8/2022 | Cui et al. |
| 2022/0259947 A1 | 8/2022 | Li et al. |
| 2022/0259964 A1 | 8/2022 | Zhang et al. |
| 2022/0268201 A1 | 8/2022 | Feng et al. |
| 2022/0282606 A1 | 9/2022 | Zhong et al. |
| 2022/0282726 A1 | 9/2022 | Zhang et al. |
| 2022/0290549 A1 | 9/2022 | Zhang et al. |
| 2022/0294194 A1 | 9/2022 | Cao et al. |
| 2022/0298906 A1 | 9/2022 | Zhong et al. |
| 2022/0307359 A1 | 9/2022 | Liu et al. |
| 2022/0307424 A1 | 9/2022 | Wang et al. |
| 2022/0314248 A1 | 10/2022 | Ge et al. |
| 2022/0315347 A1 | 10/2022 | Liu et al. |
| 2022/0316306 A1 | 10/2022 | Liu et al. |
| 2022/0316362 A1 | 10/2022 | Zhang et al. |
| 2022/0316461 A1 | 10/2022 | Wang et al. |
| 2022/0325608 A1 | 10/2022 | Zhang et al. |
| 2022/0330411 A1 | 10/2022 | Liu et al. |
| 2022/0333471 A1 | 10/2022 | Zhong et al. |
| 2022/0339646 A1 | 10/2022 | Yu et al. |
| 2022/0341358 A1 | 10/2022 | Ji et al. |
| 2022/0341362 A1 | 10/2022 | Feng et al. |
| 2022/0341415 A1 | 10/2022 | Deng et al. |
| 2022/0345007 A1 | 10/2022 | Liu et al. |
| 2022/0349345 A1 | 11/2022 | Zhang et al. |
| 2022/0353980 A1 | 11/2022 | Liu et al. |
| 2022/0361309 A1 | 11/2022 | Liu et al. |
| 2022/0364452 A1 | 11/2022 | Wang et al. |
| 2022/0364453 A1 | 11/2022 | Chang et al. |
| 2022/0372865 A1 | 11/2022 | Lin et al. |
| 2022/0376280 A1 | 11/2022 | Shao et al. |
| 2022/0381126 A1 | 12/2022 | Cui et al. |
| 2022/0389799 A1 | 12/2022 | Mao |
| 2022/0389803 A1 | 12/2022 | Zhang et al. |
| 2022/0389804 A1 | 12/2022 | Cui et al. |
| 2022/0389865 A1 | 12/2022 | Feng et al. |
| 2022/0389867 A1 | 12/2022 | Li et al. |
| 2022/0412196 A1 | 12/2022 | Cui et al. |
| 2022/0412199 A1 | 12/2022 | Mao et al. |
| 2022/0412200 A1 | 12/2022 | Zhang et al. |
| 2022/0412258 A1 | 12/2022 | Li et al. |
| 2022/0412379 A1 | 12/2022 | Wang et al. |
| 2023/0001524 A1 | 1/2023 | Jiang et al. |
| 2023/0003238 A1 | 1/2023 | Du et al. |
| 2023/0015132 A1 | 1/2023 | Feng et al. |
| 2023/0015529 A1 | 1/2023 | Zhang et al. |
| 2023/0015581 A1 | 1/2023 | Ji et al. |
| 2023/0017968 A1 | 1/2023 | Deng et al. |
| 2023/0029574 A1 | 2/2023 | Zhang et al. |
| 2023/0029671 A1 | 2/2023 | Han et al. |
| 2023/0036118 A1 | 2/2023 | Xing et al. |
| 2023/0040970 A1 | 2/2023 | Liu et al. |
| 2023/0042379 A1 | 2/2023 | Zhang et al. |
| 2023/0047033 A1 | 2/2023 | Fu et al. |
| 2023/0048551 A1 | 2/2023 | Feng et al. |
| 2023/0049462 A1 | 2/2023 | Zhang et al. |
| 2023/0064964 A1 | 3/2023 | Wang et al. |
| 2023/0074794 A1 | 3/2023 | Liu et al. |
| 2023/0085124 A1 | 3/2023 | Zhong et al. |
| 2023/0092506 A1 | 3/2023 | Zhong et al. |
| 2023/0092705 A1 | 3/2023 | Liu et al. |
| 2023/0106683 A1 | 4/2023 | Zhang et al. |
| 2023/0107300 A1 | 4/2023 | Huang et al. |
| 2023/0107791 A1 | 4/2023 | Zhang et al. |
| 2023/0109018 A1 | 4/2023 | Du et al. |
| 2023/0116458 A1 | 4/2023 | Liu et al. |
| 2023/0117362 A1 | 4/2023 | Zhang et al. |
| 2023/0119725 A1 | 4/2023 | Wang et al. |
| 2023/0119876 A1 | 4/2023 | Mao et al. |
| 2023/0119896 A1 | 4/2023 | Zhang et al. |
| 2023/0120810 A1 | 4/2023 | Fu et al. |
| 2023/0121251 A1 | 4/2023 | Cui et al. |
| 2023/0124444 A1 | 4/2023 | Chang et al. |
| 2023/0138582 A1 | 5/2023 | Li et al. |
| 2023/0144116 A1 | 5/2023 | Li et al. |
| 2023/0145963 A1 | 5/2023 | Zhang et al. |
| 2023/0151722 A1 | 5/2023 | Cui et al. |
| 2023/0151723 A1 | 5/2023 | Ji et al. |
| 2023/0152793 A1 | 5/2023 | Wang et al. |
| 2023/0160289 A1 | 5/2023 | Cui et al. |
| 2023/0160510 A1 | 5/2023 | Bao et al. |
| 2023/0163580 A1 | 5/2023 | Ji et al. |
| 2023/0167776 A1 | 6/2023 | Cui et al. |

FOREIGN PATENT DOCUMENTS

| | | | |
|---|---|---|---|
| CA | 2043184 | | 8/1994 |
| CA | 2829762 | | 9/2012 |
| CA | 2737321 | | 9/2013 |
| CA | 2876687 | A1 | 5/2014 |
| CA | 2693567 | | 9/2014 |
| CA | 2964597 | | 10/2017 |
| CA | 2876687 | C | 4/2019 |
| CA | 3138533 | | 11/2020 |
| CA | 2919175 | | 3/2021 |
| CN | 2622404 | | 6/2004 |
| CN | 2779054 | | 5/2006 |
| CN | 2890325 | | 4/2007 |
| CN | 200964929 | Y | 10/2007 |
| CN | 101323151 | A | 12/2008 |
| CN | 201190660 | Y | 2/2009 |
| CN | 201190892 | Y | 2/2009 |
| CN | 201190893 | Y | 2/2009 |
| CN | 101414171 | A | 4/2009 |
| CN | 201215073 | Y | 4/2009 |
| CN | 201236650 | Y | 5/2009 |
| CN | 201275542 | Y | 7/2009 |
| CN | 201275801 | Y | 7/2009 |
| CN | 201333385 | Y | 10/2009 |
| CN | 201443300 | U | 4/2010 |
| CN | 201496415 | U | 6/2010 |
| CN | 201501365 | U | 6/2010 |
| CN | 201507271 | U | 6/2010 |
| CN | 101323151 | B | 7/2010 |
| CN | 201560210 | U | 8/2010 |
| CN | 201581862 | U | 9/2010 |
| CN | 201610728 | U | 10/2010 |
| CN | 201610751 | U | 10/2010 |
| CN | 201618530 | U | 11/2010 |
| CN | 201661255 | U | 12/2010 |
| CN | 101949382 | | 1/2011 |
| CN | 201756927 | U | 3/2011 |
| CN | 101414171 | B | 5/2011 |
| CN | 102128011 | A | 7/2011 |
| CN | 102140898 | A | 8/2011 |
| CN | 102155172 | A | 8/2011 |
| CN | 102182904 | | 9/2011 |
| CN | 202000930 | U | 10/2011 |
| CN | 202055781 | U | 11/2011 |
| CN | 202082265 | U | 12/2011 |
| CN | 202100216 | U | 1/2012 |
| CN | 202100217 | U | 1/2012 |
| CN | 202100815 | U | 1/2012 |
| CN | 202124340 | U | 1/2012 |
| CN | 202140051 | U | 2/2012 |
| CN | 202140080 | U | 2/2012 |
| CN | 202144789 | U | 2/2012 |
| CN | 202144943 | U | 2/2012 |
| CN | 202149354 | U | 2/2012 |
| CN | 102383748 | A | 3/2012 |

(56) References Cited

FOREIGN PATENT DOCUMENTS

| | | |
|---|---|---|
| CN | 202156297 U | 3/2012 |
| CN | 202158355 U | 3/2012 |
| CN | 202163504 U | 3/2012 |
| CN | 202165236 U | 3/2012 |
| CN | 202180866 U | 4/2012 |
| CN | 202181875 U | 4/2012 |
| CN | 202187744 U | 4/2012 |
| CN | 202191854 U | 4/2012 |
| CN | 202250008 U | 5/2012 |
| CN | 101885307 | 7/2012 |
| CN | 102562020 A | 7/2012 |
| CN | 202326156 U | 7/2012 |
| CN | 202370773 U | 8/2012 |
| CN | 202417397 U | 9/2012 |
| CN | 202417461 U | 9/2012 |
| CN | 102729335 A | 10/2012 |
| CN | 202463955 U | 10/2012 |
| CN | 202463957 U | 10/2012 |
| CN | 202467739 U | 10/2012 |
| CN | 202467801 U | 10/2012 |
| CN | 202531016 U | 11/2012 |
| CN | 202544794 U | 11/2012 |
| CN | 102825039 A | 12/2012 |
| CN | 202578592 U | 12/2012 |
| CN | 202579164 U | 12/2012 |
| CN | 202594808 U | 12/2012 |
| CN | 202594928 U | 12/2012 |
| CN | 202596615 U | 12/2012 |
| CN | 202596616 U | 12/2012 |
| CN | 102849880 A | 1/2013 |
| CN | 102889191 A | 1/2013 |
| CN | 202641535 U | 1/2013 |
| CN | 202645475 U | 1/2013 |
| CN | 202666716 U | 1/2013 |
| CN | 202669645 U | 1/2013 |
| CN | 202669944 U | 1/2013 |
| CN | 202671336 U | 1/2013 |
| CN | 202673269 U | 1/2013 |
| CN | 202751982 U | 2/2013 |
| CN | 102963629 A | 3/2013 |
| CN | 202767964 U | 3/2013 |
| CN | 202789791 U | 3/2013 |
| CN | 202789792 U | 3/2013 |
| CN | 202810717 U | 3/2013 |
| CN | 202827276 U | 3/2013 |
| CN | 202833093 U | 3/2013 |
| CN | 202833370 U | 3/2013 |
| CN | 102140898 B | 4/2013 |
| CN | 202895467 U | 4/2013 |
| CN | 202926404 U | 5/2013 |
| CN | 202935216 U | 5/2013 |
| CN | 202935798 U | 5/2013 |
| CN | 202935816 U | 5/2013 |
| CN | 202970631 U | 6/2013 |
| CN | 103223315 A | 7/2013 |
| CN | 203050598 U | 7/2013 |
| CN | 103233714 A | 8/2013 |
| CN | 103233715 A | 8/2013 |
| CN | 103245523 A | 8/2013 |
| CN | 103247220 A | 8/2013 |
| CN | 103253839 A | 8/2013 |
| CN | 103277290 A | 9/2013 |
| CN | 103321782 A | 9/2013 |
| CN | 203170270 U | 9/2013 |
| CN | 203172509 U | 9/2013 |
| CN | 203175778 U | 9/2013 |
| CN | 203175787 U | 9/2013 |
| CN | 102849880 B | 10/2013 |
| CN | 203241231 U | 10/2013 |
| CN | 203244941 U | 10/2013 |
| CN | 203244942 U | 10/2013 |
| CN | 203303798 U | 11/2013 |
| CN | 102155172 B | 12/2013 |
| CN | 102729335 B | 12/2013 |
| CN | 103420532 A | 12/2013 |
| CN | 203321792 U | 12/2013 |
| CN | 203412658 | 1/2014 |
| CN | 203420697 U | 2/2014 |
| CN | 203480755 U | 3/2014 |
| CN | 103711437 A | 4/2014 |
| CN | 203531815 U | 4/2014 |
| CN | 203531871 U | 4/2014 |
| CN | 203531883 U | 4/2014 |
| CN | 203556164 U | 4/2014 |
| CN | 203558809 U | 4/2014 |
| CN | 203559861 U | 4/2014 |
| CN | 203559893 U | 4/2014 |
| CN | 203560189 U | 4/2014 |
| CN | 102704870 B | 5/2014 |
| CN | 203611843 U | 5/2014 |
| CN | 203612531 U | 5/2014 |
| CN | 203612843 U | 5/2014 |
| CN | 203614062 U | 5/2014 |
| CN | 203614388 U | 5/2014 |
| CN | 203621045 U | 6/2014 |
| CN | 203621046 U | 6/2014 |
| CN | 203621051 U | 6/2014 |
| CN | 203640993 U | 6/2014 |
| CN | 203655221 U | 6/2014 |
| CN | 103899280 A | 7/2014 |
| CN | 103923670 A | 7/2014 |
| CN | 203685052 U | 7/2014 |
| CN | 203716936 U | 7/2014 |
| CN | 103990410 A | 8/2014 |
| CN | 103993869 A | 8/2014 |
| CN | 203754009 U | 8/2014 |
| CN | 203754025 U | 8/2014 |
| CN | 203754341 U | 8/2014 |
| CN | 203756614 U | 8/2014 |
| CN | 203770264 U | 8/2014 |
| CN | 203784519 U | 8/2014 |
| CN | 203784520 U | 8/2014 |
| CN | 104057864 A | 9/2014 |
| CN | 203819819 U | 9/2014 |
| CN | 203823431 U | 9/2014 |
| CN | 203835337 U | 9/2014 |
| CN | 104074500 A | 10/2014 |
| CN | 203876633 U | 10/2014 |
| CN | 203876636 U | 10/2014 |
| CN | 203877364 U | 10/2014 |
| CN | 203877365 U | 10/2014 |
| CN | 203877375 U | 10/2014 |
| CN | 203877424 U | 10/2014 |
| CN | 203879476 U | 10/2014 |
| CN | 203890292 U | 10/2014 |
| CN | 203899476 U | 10/2014 |
| CN | 203906206 U | 10/2014 |
| CN | 104150728 A | 11/2014 |
| CN | 104176522 A | 12/2014 |
| CN | 104196464 A | 12/2014 |
| CN | 104234651 A | 12/2014 |
| CN | 203971841 U | 12/2014 |
| CN | 204020788 U | 12/2014 |
| CN | 204021980 U | 12/2014 |
| CN | 204024625 U | 12/2014 |
| CN | 204051401 U | 12/2014 |
| CN | 204060661 U | 12/2014 |
| CN | 104260672 A | 1/2015 |
| CN | 104314512 A | 1/2015 |
| CN | 204077478 U | 1/2015 |
| CN | 204077526 U | 1/2015 |
| CN | 204078307 U | 1/2015 |
| CN | 204083051 U | 1/2015 |
| CN | 204113168 U | 1/2015 |
| CN | 104340682 A | 2/2015 |
| CN | 104358536 A | 2/2015 |
| CN | 104369687 A | 2/2015 |
| CN | 104402178 A | 3/2015 |
| CN | 104402185 A | 3/2015 |
| CN | 104402186 A | 3/2015 |
| CN | 204209819 U | 3/2015 |
| CN | 204224560 U | 3/2015 |
| CN | 204225813 U | 3/2015 |
| CN | 204225839 U | 3/2015 |

(56) References Cited

FOREIGN PATENT DOCUMENTS

| | | | |
|---|---|---|---|
| CN | 104533392 | A | 4/2015 |
| CN | 104563938 | A | 4/2015 |
| CN | 104563994 | A | 4/2015 |
| CN | 104563995 | A | 4/2015 |
| CN | 104563998 | A | 4/2015 |
| CN | 104564033 | A | 4/2015 |
| CN | 204257122 | U | 4/2015 |
| CN | 204283610 | U | 4/2015 |
| CN | 204283782 | U | 4/2015 |
| CN | 204297682 | U | 4/2015 |
| CN | 204299810 | U | 4/2015 |
| CN | 103223315 | B | 5/2015 |
| CN | 104594857 | A | 5/2015 |
| CN | 104595493 | A | 5/2015 |
| CN | 104612647 | A | 5/2015 |
| CN | 104612928 | A | 5/2015 |
| CN | 104632126 | A | 5/2015 |
| CN | 204325094 | U | 5/2015 |
| CN | 204325098 | U | 5/2015 |
| CN | 204326983 | U | 5/2015 |
| CN | 204326985 | U | 5/2015 |
| CN | 204344040 | U | 5/2015 |
| CN | 204344095 | U | 5/2015 |
| CN | 104727797 | A | 6/2015 |
| CN | 204402414 | U | 6/2015 |
| CN | 204402423 | U | 6/2015 |
| CN | 204402450 | U | 6/2015 |
| CN | 103247220 | B | 7/2015 |
| CN | 104803568 | A | 7/2015 |
| CN | 204436360 | U | 7/2015 |
| CN | 204457524 | U | 7/2015 |
| CN | 204472485 | U | 7/2015 |
| CN | 204473625 | U | 7/2015 |
| CN | 204477303 | U | 7/2015 |
| CN | 204493095 | U | 7/2015 |
| CN | 204493309 | U | 7/2015 |
| CN | 103253839 | B | 8/2015 |
| CN | 104820372 | A | 8/2015 |
| CN | 104832093 | A | 8/2015 |
| CN | 104863523 | A | 8/2015 |
| CN | 204552723 | U | 8/2015 |
| CN | 204553866 | U | 8/2015 |
| CN | 204571831 | U | 8/2015 |
| CN | 204703814 | U | 10/2015 |
| CN | 204703833 | U | 10/2015 |
| CN | 204703834 | U | 10/2015 |
| CN | 105092401 | A | 11/2015 |
| CN | 103233715 | B | 12/2015 |
| CN | 103790927 | | 12/2015 |
| CN | 105207097 | | 12/2015 |
| CN | 204831952 | U | 12/2015 |
| CN | 204899777 | U | 12/2015 |
| CN | 102602323 | | 1/2016 |
| CN | 105240064 | A | 1/2016 |
| CN | 204944834 | | 1/2016 |
| CN | 205042127 | U | 2/2016 |
| CN | 205172478 | U | 4/2016 |
| CN | 103993869 | B | 5/2016 |
| CN | 105536299 | A | 5/2016 |
| CN | 105545207 | A | 5/2016 |
| CN | 205260249 | | 5/2016 |
| CN | 103233714 | B | 6/2016 |
| CN | 104340682 | B | 6/2016 |
| CN | 205297518 | U | 6/2016 |
| CN | 205298447 | U | 6/2016 |
| CN | 205391821 | U | 7/2016 |
| CN | 205400701 | U | 7/2016 |
| CN | 103277290 | B | 8/2016 |
| CN | 104260672 | B | 8/2016 |
| CN | 205477370 | U | 8/2016 |
| CN | 205479153 | U | 8/2016 |
| CN | 205503058 | U | 8/2016 |
| CN | 205503068 | U | 8/2016 |
| CN | 205503089 | U | 8/2016 |
| CN | 105958098 | A | 9/2016 |
| CN | 205599180 | | 9/2016 |
| CN | 205599180 | U | 9/2016 |
| CN | 106121577 | A | 11/2016 |
| CN | 205709587 | | 11/2016 |
| CN | 104612928 | B | 12/2016 |
| CN | 106246120 | A | 12/2016 |
| CN | 205805471 | | 12/2016 |
| CN | 106321045 | A | 1/2017 |
| CN | 205858306 | | 1/2017 |
| CN | 106438310 | A | 2/2017 |
| CN | 205937833 | | 2/2017 |
| CN | 104563994 | B | 3/2017 |
| CN | 206129196 | | 4/2017 |
| CN | 104369687 | B | 5/2017 |
| CN | 106715165 | | 5/2017 |
| CN | 106761561 | A | 5/2017 |
| CN | 105240064 | B | 6/2017 |
| CN | 206237147 | | 6/2017 |
| CN | 206287832 | | 6/2017 |
| CN | 206346711 | | 7/2017 |
| CN | 104563995 | B | 9/2017 |
| CN | 107120822 | | 9/2017 |
| CN | 107143298 | A | 9/2017 |
| CN | 107159046 | A | 9/2017 |
| CN | 107188018 | A | 9/2017 |
| CN | 206496016 | | 9/2017 |
| CN | 104564033 | B | 10/2017 |
| CN | 107234358 | A | 10/2017 |
| CN | 107261975 | A | 10/2017 |
| CN | 206581929 | | 10/2017 |
| CN | 104820372 | B | 12/2017 |
| CN | 105092401 | B | 12/2017 |
| CN | 107476769 | A | 12/2017 |
| CN | 107520526 | A | 12/2017 |
| CN | 206754664 | | 12/2017 |
| CN | 107605427 | A | 1/2018 |
| CN | 106438310 | B | 2/2018 |
| CN | 107654196 | A | 2/2018 |
| CN | 107656499 | A | 2/2018 |
| CN | 107728657 | A | 2/2018 |
| CN | 206985503 | | 2/2018 |
| CN | 207017968 | | 2/2018 |
| CN | 107859053 | A | 3/2018 |
| CN | 207057867 | | 3/2018 |
| CN | 207085817 | | 3/2018 |
| CN | 105545207 | B | 4/2018 |
| CN | 107883091 | A | 4/2018 |
| CN | 107902427 | A | 4/2018 |
| CN | 107939290 | A | 4/2018 |
| CN | 107956708 | | 4/2018 |
| CN | 207169595 | | 4/2018 |
| CN | 207194873 | | 4/2018 |
| CN | 207245674 | | 4/2018 |
| CN | 108034466 | A | 5/2018 |
| CN | 108036071 | A | 5/2018 |
| CN | 108087050 | A | 5/2018 |
| CN | 207380566 | | 5/2018 |
| CN | 108103483 | A | 6/2018 |
| CN | 108179046 | A | 6/2018 |
| CN | 108254276 | A | 7/2018 |
| CN | 108311535 | A | 7/2018 |
| CN | 207583576 | | 7/2018 |
| CN | 207634064 | | 7/2018 |
| CN | 207648054 | | 7/2018 |
| CN | 207650621 | | 7/2018 |
| CN | 108371894 | A | 8/2018 |
| CN | 207777153 | | 8/2018 |
| CN | 108547601 | A | 9/2018 |
| CN | 108547766 | A | 9/2018 |
| CN | 108555826 | A | 9/2018 |
| CN | 108561098 | A | 9/2018 |
| CN | 108561750 | A | 9/2018 |
| CN | 108590617 | A | 9/2018 |
| CN | 207813495 | | 9/2018 |
| CN | 207814698 | | 9/2018 |
| CN | 207862275 | | 9/2018 |
| CN | 108687954 | A | 10/2018 |
| CN | 207935270 | | 10/2018 |
| CN | 207961582 | | 10/2018 |

(56) References Cited

FOREIGN PATENT DOCUMENTS

| | | |
|---|---|---|
| CN | 207964530 | 10/2018 |
| CN | 108789848 A | 11/2018 |
| CN | 108799473 | 11/2018 |
| CN | 108868675 A | 11/2018 |
| CN | 208086829 | 11/2018 |
| CN | 208089263 | 11/2018 |
| CN | 208169068 | 11/2018 |
| CN | 108979569 A | 12/2018 |
| CN | 109027662 A | 12/2018 |
| CN | 109058092 A | 12/2018 |
| CN | 208179454 | 12/2018 |
| CN | 208179502 | 12/2018 |
| CN | 208253147 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |
| CN | 110374745 A | 10/2019 |
| CN | 209534736 | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 | 11/2019 |
| CN | 209653968 | 11/2019 |
| CN | 209654004 | 11/2019 |
| CN | 209654022 | 11/2019 |
| CN | 209654128 | 11/2019 |
| CN | 209656622 | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 | 12/2019 |
| CN | 209780827 | 12/2019 |
| CN | 209798631 | 12/2019 |
| CN | 209799942 | 12/2019 |
| CN | 209800178 | 12/2019 |
| CN | 209855723 | 12/2019 |
| CN | 209855742 | 12/2019 |
| CN | 209875063 | 12/2019 |
| CN | 110656919 A | 1/2020 |
| CN | 107520526 B | 2/2020 |
| CN | 110787667 A | 2/2020 |
| CN | 110821464 A | 2/2020 |
| CN | 110833665 A | 2/2020 |
| CN | 110848028 A | 2/2020 |
| CN | 210049880 | 2/2020 |
| CN | 210049882 | 2/2020 |
| CN | 210097596 | 2/2020 |
| CN | 210105817 | 2/2020 |
| CN | 210105818 | 2/2020 |
| CN | 210105993 | 2/2020 |
| CN | 110873093 A | 3/2020 |
| CN | 210139911 | 3/2020 |
| CN | 110947681 A | 4/2020 |
| CN | 111058810 A | 4/2020 |
| CN | 111075391 A | 4/2020 |
| CN | 210289931 | 4/2020 |
| CN | 210289932 | 4/2020 |
| CN | 210289933 | 4/2020 |
| CN | 210303516 | 4/2020 |
| CN | 211412945 | 4/2020 |
| CN | 111089003 A | 5/2020 |
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |
| CN | 111206901 A | 5/2020 |
| CN | 111206992 A | 5/2020 |
| CN | 111206994 A | 5/2020 |
| CN | 210449044 | 5/2020 |
| CN | 210460875 | 5/2020 |
| CN | 210522432 | 5/2020 |
| CN | 210598943 | 5/2020 |
| CN | 210598945 | 5/2020 |
| CN | 210598946 | 5/2020 |
| CN | 210599194 | 5/2020 |
| CN | 210599303 | 5/2020 |
| CN | 210600110 | 5/2020 |
| CN | 111219326 A | 6/2020 |
| CN | 111350595 A | 6/2020 |
| CN | 210660319 | 6/2020 |
| CN | 210714569 | 6/2020 |
| CN | 210769168 | 6/2020 |

(56) References Cited

FOREIGN PATENT DOCUMENTS

| | | |
|---|---|---|
| CN | 210769169 | 6/2020 |
| CN | 210769170 | 6/2020 |
| CN | 210770133 | 6/2020 |
| CN | 210825844 | 6/2020 |
| CN | 210888904 | 6/2020 |
| CN | 210888905 | 6/2020 |
| CN | 210889242 | 6/2020 |
| CN | 111397474 A | 7/2020 |
| CN | 111412064 A | 7/2020 |
| CN | 111441923 A | 7/2020 |
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 | 8/2020 |
| CN | 211201920 | 8/2020 |
| CN | 211202218 | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |
| CN | 211384571 | 9/2020 |
| CN | 211397553 | 9/2020 |
| CN | 211397677 | 9/2020 |
| CN | 211500955 | 9/2020 |
| CN | 211524765 | 9/2020 |
| DE | 4004854 | 8/1991 |
| DE | 4241614 | 6/1994 |
| DE | 102009022859 | 12/2010 |
| DE | 102012018825 | 3/2014 |
| DE | 102013111655 | 12/2014 |
| DE | 102015103872 | 10/2015 |
| DE | 102013114335 | 12/2020 |
| EP | 0835983 | 4/1998 |
| EP | 1378683 | 1/2004 |
| EP | 2143916 | 1/2010 |
| EP | 2613023 | 7/2013 |
| EP | 3095989 | 11/2016 |
| EP | 3211766 | 8/2017 |
| EP | 3049642 | 4/2018 |
| EP | 3354866 | 8/2018 |
| EP | 3075946 | 5/2019 |
| FR | 2795774 | 6/1999 |
| GB | 474072 | 10/1937 |
| GB | 1438172 | 6/1976 |
| IN | 203879479 U | 10/2014 |
| IN | 203975450 U | 12/2014 |
| JP | S57135212 | 2/1984 |
| KR | 20020026398 | 4/2002 |
| RU | 13562 | 4/2000 |
| WO | 1993020328 | 10/1993 |
| WO | 2006025886 | 3/2006 |
| WO | 2009023042 | 2/2009 |
| WO | 20110133821 | 10/2011 |
| WO | 2012139380 | 10/2012 |
| WO | 2013158822 | 10/2013 |
| WO | PCT/CN2012/074945 | 11/2013 |
| WO | 2013185399 | 12/2013 |
| WO | 2015158020 | 10/2015 |
| WO | 2016014476 | 1/2016 |
| WO | 2016033983 | 3/2016 |
| WO | 2016078181 | 5/2016 |
| WO | 2016101374 | 6/2016 |
| WO | 2016112590 | 7/2016 |
| WO | 2016/186790 | 11/2016 |
| WO | 2017123656 A | 7/2017 |
| WO | 2017146279 | 8/2017 |
| WO | 2017213848 | 12/2017 |
| WO | 2018031029 | 2/2018 |
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018/132106 | 7/2018 |
| WO | 2018156131 | 8/2018 |
| WO | 2018075034 | 10/2018 |
| WO | 2018187346 | 10/2018 |
| WO | 2018031031 | 2/2019 |
| WO | 2019045691 | 3/2019 |
| WO | 2019046680 | 3/2019 |
| WO | 2019060922 | 3/2019 |
| WO | 2019117862 | 6/2019 |
| WO | 2019126742 | 6/2019 |
| WO | 2019147601 | 8/2019 |
| WO | 2019169366 | 9/2019 |
| WO | 2019195651 | 10/2019 |
| WO | 2019200510 | 10/2019 |
| WO | 2019210417 | 11/2019 |
| WO | 2020018068 | 1/2020 |
| WO | 2020046866 | 3/2020 |
| WO | 2020072076 | 4/2020 |
| WO | 2020076569 | 4/2020 |
| WO | 2020097060 | 5/2020 |
| WO | 2020104088 | 5/2020 |
| WO | 2020131085 | 6/2020 |
| WO | 2020211083 | 10/2020 |
| WO | 2020211086 | 10/2020 |
| WO | 2021/038604 | 3/2021 |
| WO | 2021038604 | 3/2021 |
| WO | 2021041783 | 3/2021 |

OTHER PUBLICATIONS

Researchgate, Answer by Byron Woolridge, found at https://www.researchgate.net/post/How_can_we_improve_the_efficiency_of_the_gas_turbine_cycles, Jan. 1, 2013.

Filipović, Ivan, Preliminary Selection of Basic Parameters of Different Torsional Vibration Dampers Intended for use in Medium-Speed Diesel Engines, Transactions of Famena XXXVI-3 (2012).

Marine Turbine Technologies, 1 MW Power Generation Package, http://marineturbine.com/power-generation, 2017.

Business Week: Fiber-optic cables help fracking, cablinginstall.com. Jul. 12, 2013. https://www.cablinginstall.com/cable/article/16474208/businessweek-fiberoptic-cables-help-fracking.

Fracking companies switch to electric motors to power pumps, iadd-intl.org. Jun. 27, 2019. https://www.iadd-intl.org/articles/fracking-companies-switch-to-electric-motors-to-power-pumps/.

The Leader in Frac Fueling, suncoastresources.com. Jun. 29, 2015. https://web.archive.org/web/20150629220609/https://www.suncoastresources.com/oilfield/fueling-services/.

Mobile Fuel Delivery, atlasoil.com. Mar. 6, 2019. https://www.atlasoil.com/nationwide-fueling/onsite-and-mobile-fueling.

Frac Tank Hose (FRAC), 4starhose.com. Accessed: Nov. 10, 2019. http://www.4starhose.com/product/frac_tank_hose_frac.aspx.

PLOS ONE, Dynamic Behavior of Reciprocating Plunger Pump Discharge Valve Based on Fluid Structure Interaction and Experimental Analysis. Oct. 21, 2015.

FMC Technologies, Operation and Maintenance Manual, L06 Through L16 Triplex Pumps Doc No. OMM50000903 Rev: E p. 1 of 66. Aug. 27, 2009.

Gardner Denver Hydraulic Fracturing Pumps GD 3000 https://www.gardnerdenver.com/en-us/pumps/triplex-fracking-pump-gd-3000.

Lekontsev, Yu M., et al. "Two-side sealer operation." Journal of Mining Science 49.5 (2013): 757-762.

Tom Hausfeld, GE Power & Water, and Eldon Schelske, Evolution Well Services, TM2500+ Power for Hydraulic Fracturing.

FTS International's Dual Fuel Hydraulic Fracturing Equipment Increases Operational Efficiencies, Provides Cost Benefits, Jan. 3, 2018.

CNG Delivery, Fracturing with natural gas, dual-fuel drilling with CNG, Aug. 22, 2019.

(56) References Cited

OTHER PUBLICATIONS

PbNG, Natural Gas Fuel for Drilling and Hydraulic Fracturing, Diesel Displacement / Dual Fuel & Bi-Fuel, May 2014.
Integrated Flow, Skid-mounted Modular Process Systems, Jul. 15, 2017, https://ifsolutions.com/why-modular/.
Cameron, A Schlumberger Company, Frac Manifold Systems, 2016.
ZSi-Foster, Energy | Solar | Fracking | Oil and Gas, Aug. 2020, https://www.zsi-foster.com/energy-solar-fracking-oil-and-gas.html.
JBG Enterprises, Inc., WS-Series Blowout Prevention Safety Coupling—Quick Release Couplings, Sep. 11, 2015, http://www.jgbhose.com/products/WS-Series-Blowout-Prevention-Safety-Coupling.asp.
Halliburton, Vessel-based Modular Solution (VMS), 2015.
Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.
Wolf, Jürgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
Ginter, Timothy, and Thomas Bouvay. "Uprate options for the MS7001 heavy duty gas turbine." GE paper GER-3808C, GE Energy 12 (2006).
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
II-VI Marlow Industries, Thermoelectric Technologies in Oil, Gas, and Mining Industries, blog.marlow.com (Jul. 24, 2019).
B.M. Mahlalela, et al., .Electric Power Generation Potential Based on Waste Heat and Geothermal Resources in South Africa, pangea.stanford.edu (Feb. 11, 2019).
Department of Energy, United States of America, The Water-Energy Nexus: Challenges and Opportunities purenergypolicy.org (Jun. 2014).
Ankit Tiwari, Design of a Cooling System for a Hydraulic Fracturing Equipment, The Pennsylvania State University, The Graduate School, College of Engineering, 2015.
Jp Yadav et al., Power Enhancement of Gas Turbine Plant by Intake Air Fog Cooling, Jun. 2015.
Mee Industries: Inlet Air Fogging Systems for Oil, Gas and Petrochemical Processing, Verdict Media Limited Copyright 2020.
M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.
Advances in Popular Torque-Link Solution Offer OEMs Greater Benefit, Jun. 21, 2018.
Emmanuel Akita et al., Mewbourne College of Earth & Energy, Society of Petroleum Engineers; Drilling Systems Automation Technical Section (DSATS); 2019.
PowerShelter Kit II, nooutage.com, Sep. 6, 2019.
EMPengineering.com, HEMP Resistant Electrical Generators / Hardened Structures HEMP/GMD Shielded Generators, Virginia, Nov. 3, 2012.
Blago Minovski, Coupled Simulations of Cooling and Engine Systems for Unsteady Analysis of the Benefits of Thermal Engine Encapsulation, Department of Applied Mechanics, Chalmers University of Technology Göteborg, Sweden 2015.
J. Porteiro et al., Feasibility of a new domestic CHP trigeneration with heat pump: II. Availability analysis. Design and development, Applied Thermal Engineering 24 (2004) 1421-1429.
ISM, What is Cracking Pressure, 2019.
Swagelok, The right valve for controlling flow direction? Check, 2016.
Technology.org, Check valves how do they work and what are the main type, 2018.
de Gevigney et al., "Analysis of no-load dependent power losses in a planetary gear train by using thermal network method", International Gear Conference 2014: Aug. 26-28, 2014, Lyon, pp. 615-624.
Special-Purpose Couplings for Petroleum, Chemical, and Gas Industry Services, API Standard 671 (4th Edition) (2010).
The Application of Flexible Couplings for Turbomachinery, Jon R.Mancuso et al., Proceedings of the Eighteenthturbomachinery Symposium (1989).
Pump Control With Variable Frequency Drives, Kevin Tory, PUMPS & Systems: Advances in Motors and Drives, Reprint from Jun. 2008.
Fracture Design and Stimulation, Mike Eberhard, P.E., Wellconstruction & Operations Technical Workshop Insupport of the EPA Hydraulic Fracturing Study, Mar. 10-11, 2011.
General Purpose vs. Special Purpose Couplings, Jon Mancuso, Proceedings of the Twenty-Third Turbomachinerysymposium (1994).
Overview of Industry Guidance/Best Practices on Hydraulic Fracturing (HF), American Petroleum Institute, @ 2012.
API Member Companies, American Petroleum Institute, WaybackMachine Capture, https://web.archive.org/web/20130424080625/http://api.org/globalitems/globalheaderpages/membership/api-member-companies, accessed Jan. 4, 2021.
API's Global Industry Services, American Petroleum Institute, @ Aug. 2020.
About API, American Petroleum Institute, https://www.api.org /about, accessed Dec. 30, 2021.
About API, American Petroleum Institute, WaybackMachine Capture, https://web.archive.org/web/20110422104346 / http://api.org/aboutapi/, captured Apr. 22, 2011.
Publications, American Petroleum Institute, WaybackMachine Capture, https://web.archive.org/web/20110427043936 / http://www.api.org:80/Publications/, captured Apr. 27, 2011.
Procedures for Standards Development, American Petroleum Institute, Third Edition (2006).
WorldCat Library Collections Database Records for API Standard 671 and API Standard 674, https://www.worldcat.org/title/positive-displacement-pumps-reciprocating/oclc/ 858692269&referer=brief_results, accessed Dec. 30, 2021; and https://www.worldcat.org/title/special-purpose-couplings-for-petroleum-chemical-and-gas-industry-services/oclc/871254217&referer=brief_results, accessed Dec. 22, 2021.
2011 Publications and Services, American Petroleum Institute (2011).
Standards, American Petroleum Institute, WaybackMachine Capture, https://web.archive.org/web/20110207195046/ http:/www.api.org/Standards/, captured Feb. 7, 2011; and https://web.archive.org/web/20110204112554/http://global.ihs.com/?RID=API1, captured Feb. 4, 2011.
IHS Markit Standards Store, https://global.ihs.com/doc_ detail.cfm?document_name=API%20STD%20674&item_s_key=00010672#doc-detail-history-anchor, accessed Dec. 30, 2021; and https://global.ihs.com/doc_detail.cfm?&input_doc_number=671&input_doc_title=&document_name=API%20STD%20671&item_s_key=00010669&item_key_date=890331&origin=DSSC, accessed Dec. 30, 2021.
Dziubak, Tadeusz, "Experimental Studies of Dust Suction Irregularity from Multi-Cyclone Dust Collector of Two-Stage Air Filter", Energies 2021, 14, 3577, 28 pages.
AFGlobal Corporation, Durastim Hydraulic Fracturing Pump, a Revolutionary Design for Continuous Duty Hydraulic Fracturing, 2018.
SPM@ QEM 5000 E-Frac Pump Specification Sheet, Weir Group (2019) ("Weir 5000").
Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").
Dowell B908 "Turbo-Jet" Operator's Manual.
Jereh Debut's Super-power Turbine Fracturing Pump, Leading the Industrial Revolution, Jereh Oilfield Services Group (Mar. 19,

(56) References Cited

OTHER PUBLICATIONS

2014), https://www.prnewswire.com/news-releases/jereh-debuts-super-power-turbine-fracturing-pump-leading-the-industrial-revolution-250992111.html.

Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www.prnewswire.com/news-releases/jereh-apollo-4500-turbine-frac-pumper-finishes-successful-field-operation-in-china-300035829.html.

35% Economy Increase, Dual-fuel System Highlighting Jereh Apollo Frac Pumper, Jereh Group (Apr. 13, 2015), https://www.jereh.com/en/news/press-release/news-detail-7345.htm.

Hydraulic Fracturing: Gas turbine proves successful in shale gas field operations, Vericor (2017), https://www.vericor.com/wp-content/uploads/2020/02/7.-Fracing-4500hp-Pump-China-En.pdf ("Vericor Case Study").

Jereh Apollo Turbine Fracturing Pumper Featured on China Central Television, Jereh Group (Mar. 9, 2018), https://www.jereh.com/en/news/press-release/news-detail-7267.htm.

Jereh Unveiled New Electric Fracturing Solution at OTC 2019, Jereh Group (May 7, 2019), as available on May 28, 2019, https://web.archive.org/web/20190528183906/https://www.prnewswire.com/news-releases/jereh-unveiled-new-electric-fracturing-solution-at-otc-2019-300845028.html.

Jereh Group, Jereh Fracturing Unit, Fracturing Spread, YouTube (Mar. 30, 2015), https://www.youtube.com/watch?v=PlkDbU5dE0o.

Transcript of Jereh Group, Jereh Fracturing Unit, Fracturing Spread, YouTube (Mar. 30, 2015).

Jereh Group, Jereh Fracturing Equipment. YouTube (Jun. 8, 2015), https://www.youtube.com/watch?v=m0vMiq84P4Q.

Transcript of Jereh Group, Jereh Fracturing Equipment, YouTube (Jun. 8, 2015), https://www.youtube.com/watch?v=m0vMiq84P4Q.

Ferdinand P. Beer et al., Mechanics of Materials (6th ed. 2012).

Weir Oil & Gas Introduces Industry's First Continuous Duty 5000-Horsepower Pump, Weir Group (Jul. 25, 2019), https://www.global.weir/newsroom/news-articles/weir-oil-and-gas-introduces-industrys-first-continuous-duty-5000-horsepower-pump/.

2012 High Horsepower Summit Agenda, Natural Gas for High Horsepower Applications (Sep. 5, 2012).

Review of HHP Summit 2012, Gladstein, Neandross & Associates https://www.gladstein.org/gna-conferences/high-horsepower-summit-2012/.

Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-fracturing-spread-162113425.

Karen Boman, Turbine Technology Powers Green Field Multi-Fuel Frack Pump, Rigzone (Mar. 7, 2015), as available on Mar. 14, 2015, https://web.archive.org/web/20150314203227/https://www.rigzone.com/news/oil-gas/a/124883/Turbine_Technology_Powers_Green_Field_MultiFuel_Frack_Pump.

"Turbine Frac Units," WMD Squared (2012), https://wmdsquared.com/work/gfes-turbine-frac-units/.

Leslie Turj, Green Field asset sale called 'largest disposition industry has seen,' The INDsider Media (Mar. 19, 2014), http://theind.com/article-16497-green-field-asset-sale-called-%E2%80%98largest-disposition-industry-has-seen%60.html.

"Honghua developing new-generation shale-drilling rig, plans testing of frac pump"; Katherine Scott; Drilling Contractor May 23, 2013; accessed at https://www.drillingcontractor.org/honghua-developing-new-generation-shale-drilling-rig-plans-testing-of-frac-pump-23278.

Europump and Hyrualic Institute, Variable Speed Pumping: A Guide to Successful Applications, Elsevier Ltd, 2004.

Capstone Turbine Corporation, Capstone Receives Three Megawatt Order from Large Independent Oil & Gas Company in Eagle Ford Shale Play, Dec. 7, 2010.

Wikipedia, Westinghouse Combustion Turbine Systems Division, https://en.wikipedia.org/wiki/Westinghouse_Combustion_Turbine_Systems_Division, circa 1960.

Wikipedia, Union Pacific GTELs, https://en.wikipedia.org/wiki/Union_Pacific_GTELs, circa 1950.

HCI JET Frac, Screenshots from YouTube, Dec. 11, 2010. https://www.youtube.com/watch?v=6HjXkdbFaFQ.

AFD Petroleum Ltd., Automated Hot Zone, Frac Refueling System, Dec. 2018.

Eygun, Christiane, et al., URTeC: 2687987, Mitigating Shale Gas Developments Carbon Footprint: Evaluating and Implementing Solutions in Argentina, Copyright 2017, Unconventional Resources Technology Conference.

Walzel, Brian, Hart Energy, Oil, Gas Industry Discovers Innovative Solutions to Environmental Concerns, Dec. 10, 2018.

Frac Shack, Bi-Fuel FracFueller brochure, 2011.

Pettigrew, Dana, et al., High Pressure Multi-Stage Centrifugal Pump for 10,000 psi Frac Pump—HPHPS FRAC Pump, Copyright 2013, Society of Petroleum Engineers, SPE 166191.

Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.

Wallace, E.M., Associated Shale Gas: From Flares to Rig Power, Copyright 2015, Society of Petroleum Engineers, SPE-173491-MS.

Williams, C.W. (Gulf Oil Corp. Odessa Texas), The Use of Gas-turbine Engines in an Automated High-Pressure Water-injection Stations; American Petroleum Institute; API-63-144 (Jan. 1, 1963).

Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).

Porter, John A. (SOLAR Division International Harvester Co.), Modern Industrial Gas Turbines for the Oil Field; American Petroleum Institute; Drilling and Production Practice; API-67-243 (Jan. 1, 1967).

Cooper et al., Jet Frac Porta-Skid—A New Concept in Oil Field Service Pump Equipments[sic]; Halliburton Services; SPE-2706 (1969).

Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).

Kas'yanov et al., Application of gas-turbine engines in pumping units complexes of hydraulic fracturing of oil and gas reservoirs; Exposition Oil & Gas; (Oct. 2012) (published in Russian).

American Petroleum Institute. API 674: Positive Displacement Pumps—Reciprocating. 3rd ed. Washington, DC: API Publishing Services, 2010.

American Petroleum Institute. API 616: Gas Turbines for the Petroleum, Chemical, and Gas Industry Services. 5th ed. Washington, DC: API Publishing Services, 2011.

Karassik, Igor, Joseph Messina, Paul Cooper, and Charles Heald. Pump Handbook. 4th ed. New York: McGraw-Hill Education, 2008.

Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-general.pdf.

The Weir Group, Inc. Weir SPM Pump Product Catalog. Ft. Worth, TX: S.P.M. Flow Control, Inc. Oct. 30, 2017. https://manage.global.weir/assets/files/product%20brochures/SPM_2P140706_Pump_Product_Catalogue_View.pdf.

Shandong Saigao Group Corporation. Q4 (5W115) Quintuplex Plunger Pump. Jinan City, Shandong Province, China: Saigao. Oct. 20, 2014. https://www.saigaogroup.com/product/q400-5w115-quintuplex-plunger-pump.html.

Marine Turbine. Turbine Powered Frac Units. Franklin, Louisiana: Marine Turbine Technologies, 2020.

Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.

(56) References Cited

OTHER PUBLICATIONS

CanDyne Pump Services, Inc. Weatherford Q700 Pump. Calgary, Alberta, Canada: CanDyne Pump Services. Aug. 15, 2015. http://candyne.com/wp-content/uploads/2014/10/181905-94921.q700-quintuplex-pump.pdf.
Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.
Rigmaster Machinery Ltd., Model: 2000 RMP-6-PLEX, brochure, downloaded at https://www.rigmastermachinery.com/_files/ugd/431e62_eaecd77c9fe54af8b13d08396072da67.pdf.
Final written decision of PGR2021-00102 dated Feb. 6, 2023.
Final written decision of PGR2021-00103 dated Feb. 6, 2023.

\* cited by examiner

METHODS, SYSTEMS, AND DEVICES TO ENHANCE FRACTURING FLUID DELIVERY TO SUBSURFACE FORMATIONS DURING HIGH-PRESSURE FRACTURING OPERATIONS

PRIORITY CLAIM

This is a continuation of U.S. Non-Provisional application Ser. No. 17/670,694, filed Feb. 14, 2022, titled "METHODS, SYSTEMS, AND DEVICES TO ENHANCE FRACTURING FLUID DELIVERY TO SUBSURFACE FORMATIONS DURING HIGH-PRESSURE FRACTURING OPERATIONS," which is a continuation of U.S. Non-Provisional application Ser. No. 17/509,292, filed Oct. 25, 2021, titled "METHODS, SYSTEMS, AND DEVICES TO ENHANCE FRACTURING FLUID DELIVERY TO SUBSURFACE FORMATIONS DURING HIGH-PRESSURE FRACTURING OPERATIONS," now U.S. Pat. No. 11,365,615, issued Jun. 21, 2022, which is a continuation of U.S. Non-Provisional application Ser. No. 17/509,252, filed Oct. 25, 2021, titled "METHODS, SYSTEMS, AND DEVICES TO ENHANCE FRACTURING FLUID DELIVERY TO SUBSURFACE FORMATIONS DURING HIGH-PRESSURE FRACTURING OPERATIONS," now U.S. Pat. No. 11,255,175, issued Feb. 22, 2022, which is a continuation of U.S. Non-Provisional application Ser. No. 17/303,150, filed May 21, 2021, titled "METHODS, SYSTEMS, AND DEVICES TO ENHANCE FRACTURING FLUID DELIVERY TO SUBSURFACE FORMATIONS DURING HIGH-PRESSURE FRACTURING OPERATIONS," now U.S. Pat. No. 11,193,361, issued Dec. 7, 2021, which is a continuation of U.S. Non-Provisional application Ser. No. 17/303,146, filed May 21, 2021, titled "METHODS, SYSTEMS, AND DEVICES TO ENHANCE FRACTURING FLUID DELIVERY TO SUBSURFACE FORMATIONS DURING HIGH-PRESSURE FRACTURING OPERATIONS," now U.S. Pat. No. 11,193,360, issued Dec. 7, 2021, which claims priority to and the benefit of U.S. Provisional Application No. 63/201,721, filed May 11, 2021, titled "METHODS, SYSTEMS, AND DEVICES TO ENHANCE FRACTURING FLUID DELIVERY TO SUBSURFACE FORMATIONS DURING HIGH-PRESSURE FRACTURING OPERATIONS," and U.S. Provisional Application No. 62/705,850, filed Jul. 17, 2020, titled "METHODS, SYSTEMS, AND DEVICES FOR ENERGY DISSIPATION AND PROPPANT SUSPENSION BY INDUCED VORTEX FLOW IN MONO-BORE MANIFOLDS," the disclosures of which are incorporated herein by reference in their entirety.

TECHNICAL FIELD

The present disclosure relates to methods, systems, and devices to enhance fracturing fluid delivery to subsurface formations during high-pressure fracturing operations and, more particularly, to methods, systems, and devices to enhance fracturing fluid delivery via fluid manifold assemblies to subsurface formations during high-pressure fracturing operations, including enhancing dissipation of fluid energy associated with the fracturing fluid, enhancing suspension of proppants in the fracturing fluid, and/or enhancing fracturing fluid drainage from the manifold assembly.

BACKGROUND

Hydraulic fracturing is an oilfield operation that stimulates the production of hydrocarbons, such that the hydrocarbons may more easily or readily flow from a subsurface formation to a well. For example, a hydraulic fracturing system may be configured to fracture a formation by pumping a fracturing fluid into a well at high pressure and high flow rates. Some fracturing fluids may take the form of a slurry including water, proppants, and/or other additives, such as thickening agents and gels. The slurry may be forced via operation of one or more pumps into the formation at rates faster than can be accepted by the existing pores, fractures, faults, or other spaces within the formation. As a result, pressure builds rapidly to the point where the formation may fail and may begin to fracture. By continuing to pump the fracturing fluid into the formation, existing fractures in the formation may be caused to expand and extend in directions away from a wellbore, thereby creating additional flow paths for hydrocarbons to flow to the wellbore. The proppants may serve to prevent the expanded fractures from closing or may reduce the extent to which the expanded fractures contract when pumping of the fracturing fluid is ceased. Once the formation is fractured, large quantities of the injected fracturing fluid may be allowed to flow out of the well, and the production stream of hydrocarbons may be obtained from the formation.

To pump the fracturing fluid into the wellbore, a hydraulic fracturing system including prime movers may be used to supply power to hydraulic fracturing pumps for pumping the fracturing fluid into the formation through a high-pressure manifold configured to receive the fracturing fluid pumped to a high-pressure and flow rate by multiple fracturing pumps operating simultaneously. Each of the hydraulic fracturing pumps may include multiple cylinders and corresponding plungers that reciprocate in the respective cylinders to draw fracturing fluid into the cylinder through a one-way valve at low-pressure during an intake stroke, and force the fracturing fluid out of the cylinder through a one-way valve into the manifold at a high-pressure and flow rate during an output stroke. Each output stroke forces a charge of the fracturing fluid into the high-pressure manifold, which receives the collective high-pressure and high flow rate fracturing fluid from multiple fracturing pumps for passage to the wellbore. Rather than flowing in the high-pressure manifold at a constant pressure and flow rate, the fracturing fluid output by each of the output strokes of a plunger flows with a pulse of high-pressure and high flow rate upon each output stroke of each of the plungers of each of the fracturing pumps operating in the hydraulic fracturing system. This stroke sequence may result in large pressure oscillations in the high-pressure manifold.

This pressure oscillation is multiplied by the number of cylinders of the fracturing pump, which is further multiplied by the number of fracturing pumps operating during a fracturing operation. Some high-pressure manifolds, such as mono-bore manifolds, consolidate all of the fracturing fluid being pump by all of the fracturing pumps operating during a fracturing operation. Each of the fracturing pumps generates its own respective pressure pulsation waveform varying in amplitude and frequency from the pressure pulsation waveforms generated by operation of other fracturing pumps. While the volume of fracturing fluid in the high-pressure manifold and the geometry of the conduits between each of the fracturing pumps and the high-pressure manifold may result in dissipation of some of the energy associated with the collective pulsation waveforms, the energy associated with the pulsation waveforms may not be adequately reduced and may also introduce potential resonance in the form of standing waves inside the high-pressure manifold. This may result in inducing substantial vibration in the fracturing system, including the high-pressure manifold. Such vibration, if uncontrolled, may result in premature wear or failure of components of the fracturing system, including, for example, the high-pressure manifold, conduits between the fracturing pumps and the high-pressure manifold, manifold seals, the fracturing pumps, the prime movers, and transmissions between the prime movers and the fracturing pumps.

Moreover, a characteristic that may be relevant to the effectiveness of proppants in the fracturing fluid may be the level of proppant suspension in the fracturing fluid. For example, the manner in which the fracturing fluid flows through the manifold assembly may affect the homogeneity and/or consistency of the suspension of the proppants in the fracturing fluid pumped through the high-pressure manifold assembly, and some manifold assemblies may hinder the suspension of proppants in the manifold assembly.

In addition, because hydraulic fracturing systems are at least partially disassembled following a fracturing operation for transport to another site for use in another fracturing operation, the manifold assemblies are often drained, for example, for transportation to the next site or storage. Some manifold assemblies may be difficult to sufficiently drain, which may lead to additional weight during transportation as well as unbalanced loads. Further, fracturing fluids may contain corrosive materials and materials that may harden and adhere to the interior passages of manifold assembly components, which may result in premature wear or damage to the components, which may reduce the effectiveness of future fracturing operations.

Accordingly, Applicant has recognized a need for methods, systems, and devices that enhance fracturing fluid delivery to subsurface formations during high-pressure fracturing operations. For example, Applicant has recognized a need for methods, systems, and devices that enhance dissipation of fluid energy associated with the fracturing fluid, enhance suspension of proppants in the fracturing fluid, and/or enhance fracturing fluid drainage from the manifold assemblies. The present disclosure may address one or more of the above-referenced considerations, as well as other possible considerations.

SUMMARY

The present disclosure generally is directed to methods, systems, and devices to enhance fracturing fluid delivery via fluid manifold assemblies to subsurface formations during high-pressure fracturing operations, including enhancing dissipation of fluid energy associated with the fracturing fluid, enhancing suspension of proppants in the fracturing fluid, and/or enhancing fracturing fluid drainage from the manifold assembly. For example, in some embodiments, a manifold coupling may include first and second inlet passages for receiving respective outputs from hydraulic fracturing units and providing fluid flow between the outputs and a manifold passage of a manifold assembly. The first and second inlet passages may be oriented and/or configured such that fracturing fluid entering the manifold assembly via the first and second inlet passages promotes swirling of the fracturing fluid downstream of the manifold coupling and/or such that drainage of fracturing fluid from the manifold assembly is enhanced. Such swirling, in some embodiments, may enhance energy dissipation associated with the flow of the fracturing fluid, which may, in turn, dissipate and/or reduce vibration of the manifold assembly during a fracturing operation, and, in some embodiments, may enhance proppant suspension in the fracturing fluid flowing though the manifold assembly.

According to some embodiments, a manifold assembly to enhance fracturing fluid delivery to a subsurface formation to enhance hydrocarbon production from the subsurface formation may include a manifold section including a manifold passage having a manifold cross-section and a manifold axis extending longitudinally along a length of the manifold section. The manifold axis may be substantially centrally located within the manifold cross-section. The manifold assembly further may include a manifold coupling connected to the manifold section. The manifold coupling may include a manifold coupling passage having a coupling passage cross-section defining one or more of a coupling passage shape or a coupling passage size substantially in common with one or more of a manifold passage shape or a manifold passage size of the manifold cross-section. The manifold coupling may further include a manifold coupling axis parallel to the manifold axis. The manifold coupling also may include a first inlet passage positioned to provide fluid flow between a first fracturing fluid output of a first hydraulic fracturing pump and the manifold passage. The first inlet passage may have a first inlet passage cross-section at least partially defining a first inlet axis extending transverse relative to the manifold axis. The manifold coupling further may include a second inlet passage positioned opposite the first inlet passage to provide fluid flow between a second fracturing fluid output of a second hydraulic fracturing pump and the manifold passage. The second inlet passage may have a second inlet passage cross-section at least partially defining a second inlet axis extending transverse relative to the manifold axis and not being co-linear with the first inlet axis.

According to some embodiments, a manifold coupling to enhance fracturing fluid delivery to a subsurface formation to enhance hydrocarbon production from the subsurface formation may include a manifold coupling passage having a coupling passage cross-section defining one or more of a coupling passage shape or a coupling passage size. The manifold coupling passage may include a manifold coupling axis. The manifold coupling further may include a first inlet passage positioned to provide fluid flow between a first fracturing fluid output of a first hydraulic fracturing pump and the manifold coupling passage. The first inlet passage may have a first inlet passage cross-section at least partially defining a first inlet axis extending transverse relative to the manifold coupling axis. The manifold coupling also may include a second inlet passage positioned opposite the first inlet passage to provide fluid flow between a second fracturing fluid output of a second hydraulic fracturing pump and the manifold coupling passage. The second inlet passage may have a second inlet passage cross-section at least partially defining a second inlet axis extending transverse relative to the manifold coupling axis and not being co-linear with the first inlet axis.

According to some embodiments, a hydraulic fracturing assembly may include a plurality of hydraulic fracturing pumps positioned to pump fracturing fluid into a subsurface formation to enhance hydrocarbon production from the subsurface formation. The hydraulic fracturing assembly further may include a manifold assembly positioned to supply fracturing fluid from two or more of the plurality of hydraulic fracturing pumps to the subsurface formation. The hydraulic fracturing assembly also may include a first inlet manifold positioned to provide fluid flow between a first one of the plurality of hydraulic fracturing pumps and the manifold assembly, and a second inlet manifold positioned to provide fluid flow between a second one of the plurality of hydraulic fracturing pumps and the manifold assembly. The manifold assembly may include a manifold section including a manifold passage having a manifold cross-section and a manifold axis extending longitudinally along a length of the manifold section. The manifold axis may be substantially centrally located within the manifold cross-section. The manifold assembly further may include a manifold coupling connected to the manifold section. The manifold coupling may include a manifold coupling passage having a coupling passage cross-section defining one or more of a coupling passage shape or a coupling passage size substantially in common with one or more of a manifold passage shape or a manifold passage size of the manifold cross-section. The manifold coupling also may include a manifold coupling axis parallel to the manifold axis, and a first inlet passage connected to the first inlet manifold and positioned to provide fluid flow between a first fracturing fluid output of the first hydraulic fracturing pump and the manifold passage. The first inlet passage may have a first inlet passage cross-section at least partially defining a first inlet axis extending transverse relative to the manifold axis. The manifold coupling also may include a second inlet passage connected to the second inlet manifold and positioned to provide fluid flow between a second fracturing fluid output of the second hydraulic fracturing pump and the manifold passage. The second inlet passage may have a second inlet passage cross-section at least partially defining a second inlet axis extending transverse relative to the manifold axis and not being co-linear with the first inlet axis. The first inlet axis and the second inlet axis may be oriented relative to one another, such that fracturing fluid flowing into the manifold passage from the first inlet passage and the second inlet passage promotes swirling of the fracturing fluid downstream of the manifold coupling.

According to some embodiments, a method to enhance fracturing fluid flow between a plurality of hydraulic fracturing pumps and a subsurface formation to enhance hydrocarbon production from the subsurface formation may include connecting a plurality of hydraulic fracturing pumps to a manifold assembly including a manifold section at least partially defining a manifold passage providing fluid flow between the plurality of hydraulic fracturing pumps and the subsurface formation. The method further may include causing a first fracturing fluid output from a first hydraulic fracturing pump of the plurality of hydraulic fracturing pumps and a second fracturing fluid output from a second hydraulic fracturing pump of the plurality of hydraulic fracturing pumps to enter the manifold section, such that the first fracturing fluid output and the second fracturing fluid output promote swirling of the fracturing fluid downstream of the first fracturing fluid output and the second fracturing fluid output entering the manifold passage.

According to some embodiments, a method to enhance suspension of proppants in a fracturing fluid during a high-pressure fracturing operation may include connecting a plurality of hydraulic fracturing pumps to a manifold assembly including a manifold section at least partially defining a manifold passage providing flow of fracturing fluid including proppants between the plurality of hydraulic fracturing pumps and the subsurface formation. The method further may include causing a first fracturing fluid output from a first hydraulic fracturing pump of the plurality of hydraulic fracturing pumps and a second fracturing fluid output from a second hydraulic fracturing pump of the plurality of hydraulic fracturing pumps to enter the manifold section, such that the first fracturing fluid output and the second fracturing fluid output promote swirling of the fracturing fluid and proppants downstream of the first fracturing fluid output and the second fracturing fluid output entering the manifold passage.

According to some embodiments, a method to enhance drainage of fracturing fluid from a manifold assembly following a high-pressure fracturing operation may include providing a manifold section including a manifold passage having a manifold cross-section and a manifold axis extending longitudinally along a length of the manifold section, the manifold axis being substantially centrally located within the manifold cross-section. The method further may include providing a manifold coupling including a first inlet passage connected to a first inlet manifold and positioned to provide fluid flow between a first fracturing fluid output and the manifold passage, the first inlet passage having a first inlet passage cross-section at least partially defining a first inlet axis extending transverse relative to the manifold passage. The method also may include providing a second inlet passage connected to a second inlet manifold and positioned to provide fluid flow between a second fracturing fluid output and the manifold passage, the second inlet passage having a second inlet passage cross-section at least partially defining a second inlet axis extending transverse relative to the manifold axis. The coupling passage cross-section may define an outer manifold coupling perimeter having an upper manifold coupling portion and a lower manifold coupling portion opposite the upper manifold coupling portion. The first inlet passage cross-section may define an outer inlet perimeter having an upper inlet portion and a lower inlet portion opposite the upper inlet portion. The first inlet passage may intersect the manifold passage such that the upper inlet portion of the first inlet passage substantially coincides with the upper manifold coupling portion, and the second inlet passage cross-section may define an outer inlet perimeter having an upper inlet portion and a lower inlet portion opposite the upper inlet portion. The second inlet passage may intersect the manifold coupling passage such that the lower inlet portion of the second inlet passage substantially coincides with the lower manifold coupling portion, enhancing drainage from the manifold section.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they can be practiced. According to common practice, the various features of the drawings discussed below are not necessarily drawn to scale. Dimensions of various features and elements in the drawings can be expanded or reduced to more clearly illustrate embodiments of the disclosure.

DETAILED DESCRIPTION

The drawings include like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Figure 1:
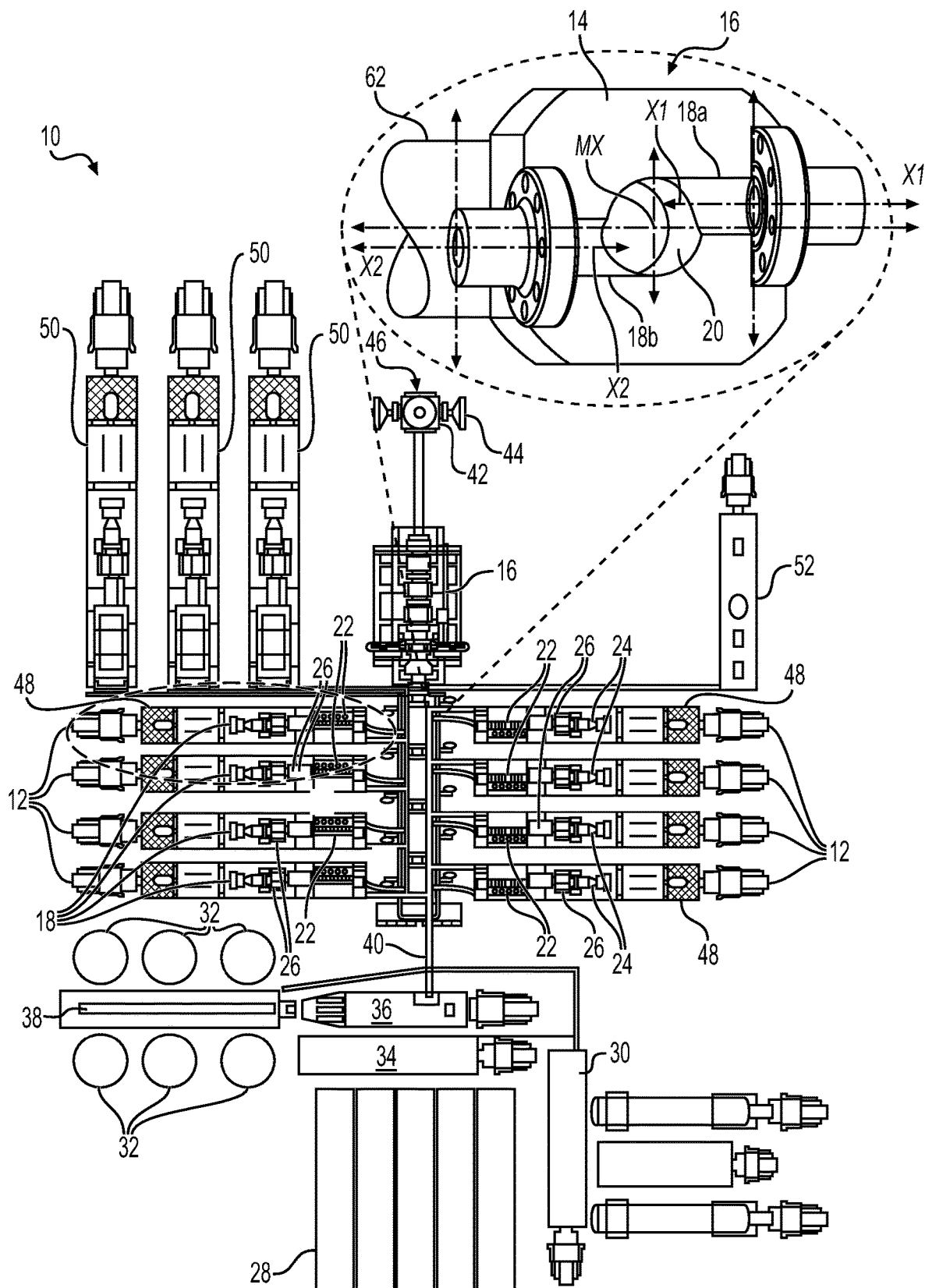
FIG. 1 schematically illustrates an example hydraulic fracturing system including a plurality of hydraulic fracturing units, and including a partial perspective section view of an example manifold coupling according to embodiments of the disclosure.

FIG. 1 schematically illustrates a top view of an example hydraulic fracturing system 10 including a plurality of hydraulic fracturing units 12 and showing an example manifold coupling 14 incorporated into an example manifold assembly 16 according to embodiments of the disclosure. The plurality of hydraulic fracturing units 12 may be configured to pump a fracturing fluid into a well at high pressure and high flow rates, so that a subterranean formation may fail and may begin to fracture in order to promote hydrocarbon production from the well. In some embodiments, the manifold coupling 14 may include first and second inlet passages 18a and 18b for receiving respective outputs from respective hydraulic fracturing units 12 and provide fluid flow between the outputs and a manifold passage 20 of the manifold assembly 16. As explained herein, in some embodiments, the first and second inlet passages 18a and 18b may be oriented and/or configured such that fracturing fluid entering the manifold assembly 16 via the first and second inlet passages 18a and 18b promotes swirling of the fracturing fluid downstream of the manifold coupling 14 and/or such that drainage of fracturing fluid from the manifold assembly 16 is enhanced.

In some embodiments, one or more of the hydraulic fracturing units 12 may include a hydraulic fracturing pump 22 driven by a prime mover 24, such as an internal combustion engine. For example, the prime movers 24 may include gas turbine engines (GTEs) or reciprocating-piston engines. In some embodiments, each of the hydraulic fracturing units 12 may include a directly-driven turbine (DDT) hydraulic fracturing pump 22, in which the hydraulic fracturing pump 22 is connected to one or more GTEs that supply power to the respective hydraulic fracturing pump 22 for supplying fracturing fluid at high pressure and high flow rates to the formation. For example, the GTE may be connected to a respective hydraulic fracturing pump 22 via a transmission 26 (e.g., a reduction transmission) connected to a drive shaft, which, in turn, is connected to a driveshaft or input flange of a respective hydraulic fracturing pump 22, which may be a reciprocating hydraulic fracturing pump, such as, for example, a plunger pump. In some embodiments, one or more of the hydraulic fracturing pumps 22 may include three, four, five, or more plungers, which each reciprocate linearly within a respective cylinder of a pump chamber. The hydraulic fracturing pumps 22 may include a suction port for drawing-in the fracturing fluid into the cylinder as the respective plunger moves in a first direction, and a discharge port for outputting the fracturing fluid at high-pressure and/or at a high flow rate as the respective plunger moves in a second direction opposite the first direction. The suction port and/or the discharge port may include a one-way valve preventing the output through the suction port and preventing suction through the discharge port. Other types of engine-to-pump arrangements are contemplated as will be understood by those skilled in the art.

In some embodiments, one or more of the GTEs may be a dual-fuel or bi-fuel GTE, for example, capable of being operated using of two or more different types of fuel, such as natural gas and diesel fuel, although other types of fuel are contemplated. For example, a dual-fuel or bi-fuel GTE may be capable of being operated using a first type of fuel, a second type of fuel, and/or a combination of the first type of fuel and the second type of fuel. For example, the fuel may include gaseous fuels, such as, for example, compressed natural gas (CNG), natural gas, field gas, pipeline gas, methane, propane, butane, and/or liquid fuels, such as, for example, diesel fuel (e.g., #2 diesel), bio-diesel fuel, bio-fuel, alcohol, gasoline, gasohol, aviation fuel, and other fuels as will be understood by those skilled in the art. Gaseous fuels may be supplied by CNG bulk vessels, a gas compressor, a liquid natural gas vaporizer, line gas, and/or well-gas produced natural gas. Other types and associated fuel supply sources are contemplated. The one or more prime movers 24 may be operated to provide horsepower to drive the transmission 26 connected to one or more of the hydraulic fracturing pumps 22 to safely and successfully fracture a formation during a well stimulation project or fracturing operation.

In some embodiments, the fracturing fluid may include, for example, water, proppants, and/or other additives, such as thickening agents and/or gels. For example, proppants may include grains of sand, ceramic beads or spheres, shells, and/or other particulates, and may be added to the fracturing fluid, along with gelling agents to create a slurry as will be understood by those skilled in the art. The slurry may be forced via the hydraulic fracturing pumps 16 into the formation at rates faster than can be accepted by the existing pores, fractures, faults, or other spaces within the formation. As a result, pressure in the formation may build rapidly to the point where the formation fails and begins to fracture. By continuing to pump the fracturing fluid into the formation, existing fractures in the formation may be caused to expand and extend in directions away from a wellbore, thereby creating additional flow paths for hydrocarbons to flow to the well. The proppants may serve to prevent the expanded fractures from closing or may reduce the extent to which the expanded fractures contract when pumping of the fracturing fluid is ceased. The effectiveness of the proppants may be related to the suspension of the proppants in the fracturing fluid. For example, the homogeneity and/or consistency of the suspension of the proppants in the fracturing fluid may affect the ability of the proppants to prevent the expanded fractures from closing or the extent to which the fractures contract after the pumping of the fracturing fluid is discontinued. If the homogeneity and/or consistency of the proppants in the fracturing fluid is low, the proppants may not be distributed into portions of the fractures and/or may not be relatively evenly distributed throughout the fractures, resulting in the loss of effectiveness of the proppants in those portions and fractures.

Once the well is fractured, large quantities of the injected fracturing fluid may be allowed to flow out of the well, and the water and any proppants not remaining in the expanded fractures may be separated from hydrocarbons produced by the well to protect downstream equipment from damage and corrosion. In some instances, the production stream of hydrocarbons may be processed to neutralize corrosive agents in the production stream resulting from the fracturing process.

In the example shown in FIG. 1, the hydraulic fracturing system 10 may include one or more water tanks 28 for supplying water for fracturing fluid, one or more chemical additive units 30 for supplying gels or agents for adding to the fracturing fluid, and one or more proppant tanks 32 (e.g., sand tanks) for supplying proppants for the fracturing fluid. The example fracturing system 10 shown also includes a hydration unit 34 for mixing water from the water tanks 28 and gels and/or agents from the chemical additive units 30 to form a mixture, for example, gelled water. The example shown also includes a blender 36, which receives the mixture from the hydration unit 34 and proppants via conveyers 38 from the proppant tanks 32. The blender 36 may mix the mixture and the proppants into a slurry to serve as fracturing fluid for the hydraulic fracturing system 10. Once combined, the slurry may be discharged through low-pressure hoses, which convey the slurry into two or more low-pressure lines in a low-pressure manifold 40. In the example shown, the low-pressure lines in the low-pressure manifold 40 may feed the slurry to the hydraulic fracturing pumps 22 through low-pressure suction hoses as will be understood by those skilled in the art.

The hydraulic fracturing pumps 22, driven by the respective prime movers 24 (e.g., GTEs), discharge the slurry (e.g., the fracturing fluid including the water, agents, gels, and/or proppants) as an output at high flow rates and/or high pressures through individual high-pressure discharge lines (e.g., inlet manifolds, see FIG. 2) into one or more high-pressure flow lines, sometimes referred to as "missiles," on the fracturing manifold assembly 16. The flow from the high-pressure flow lines may be combined at the fracturing manifold assembly 16, and one or more of the high-pressure flow lines provide fluid flow to a downstream manifold 42, sometimes referred to as a "goat head." The downstream manifold 42 delivers the slurry into a wellhead manifold 44. The wellhead manifold 44 may be configured to selectively divert the slurry to, for example, one or more wellheads 46 via operation of one or more valves. Once the fracturing process is ceased or completed, flow returning from the fractured formation discharges into a flowback manifold, and the returned flow may be collected in one or more flowback tanks as will be understood by those skilled in the art.

As schematically depicted in FIG. 1, one or more of the components of the fracturing system 10 may be configured to be portable, so that the hydraulic fracturing system 10 may be transported to a well site, assembled, operated for a period of time, at least partially disassembled, and transported to another location of another well site for use. For example, the components may be connected to and/or supported on a chassis 48, for example, a trailer and/or a support incorporated into a truck, so that they may be easily transported between well sites. In some embodiments, the prime mover 24, the transmission 26, and/or the hydraulic fracturing pump 22 may be connected to the chassis 48. For example, the chassis 48 may include a platform, the transmission 26 may be connected to the platform, and the prime mover 24 may be connected to the transmission 26. In some embodiments, the prime mover 24 may be connected to the transmission 26 without also connecting the prime mover 24 directly to the platform, which may result in fewer support structures being needed for supporting the prime mover 24, transmission 26, and/or hydraulic fracturing pump 22 on the chassis 48.

As shown in FIG. 1, some embodiments of the hydraulic fracturing system 10 may include one or more fuel supplies 50 for supplying the prime movers 24 and any other fuel-powered components of the hydraulic fracturing system 10, such as auxiliary equipment, with fuel. The fuel supplies 50 may include gaseous fuels, such as compressed natural gas (CNG), natural gas, field gas, pipeline gas, methane, propane, butane, and/or liquid fuels, such as, for example, diesel fuel (e.g., #2 diesel), bio-diesel fuel, bio-fuel, alcohol, gasoline, gasohol, aviation fuel, and other fuels. Gaseous fuels may be supplied by CNG bulk vessels, such as fuel tanks coupled to trucks, a gas compressor, a liquid natural gas vaporizer, line gas, and/or well-gas produced natural gas. The fuel may be supplied to the hydraulic fracturing units 12 by one of more fuel lines supplying the fuel to a fuel manifold and unit fuel lines between the fuel manifold and the hydraulic fracturing units 12. Other types and associated fuel supply sources and arrangements are contemplated as will be understood by those skilled in the art.

As shown in FIG. 1, some embodiments also may include one or more data centers 52 configured to facilitate receipt and transmission of data communications related to operation of one or more of the components of the hydraulic fracturing system 10. Such data communications may be received and/or transmitted via hard-wired communications cables and/or wireless communications, for example, according to known communications protocols. For example, the data centers 52 may contain at least some components of a hydraulic fracturing control assembly, such as a supervisory controller configured to receive signals from components of the hydraulic fracturing system 10 and/or communicate control signals to components of the hydraulic fracturing system 10, for example, to at least partially control operation of one or more components of the hydraulic fracturing system 10, such as, for example, the prime movers 24, the transmissions 26, and/or the hydraulic fracturing pumps 22 of the hydraulic fracturing units 12, the chemical additive units 30, the hydration units 34, the blender 36, the conveyers 38, the low-pressure manifold 40, the downstream manifold 42, the wellhead manifold 44, and/or any associated valves, pumps, and/or other components of the hydraulic fracturing system 10.

Figure 2:
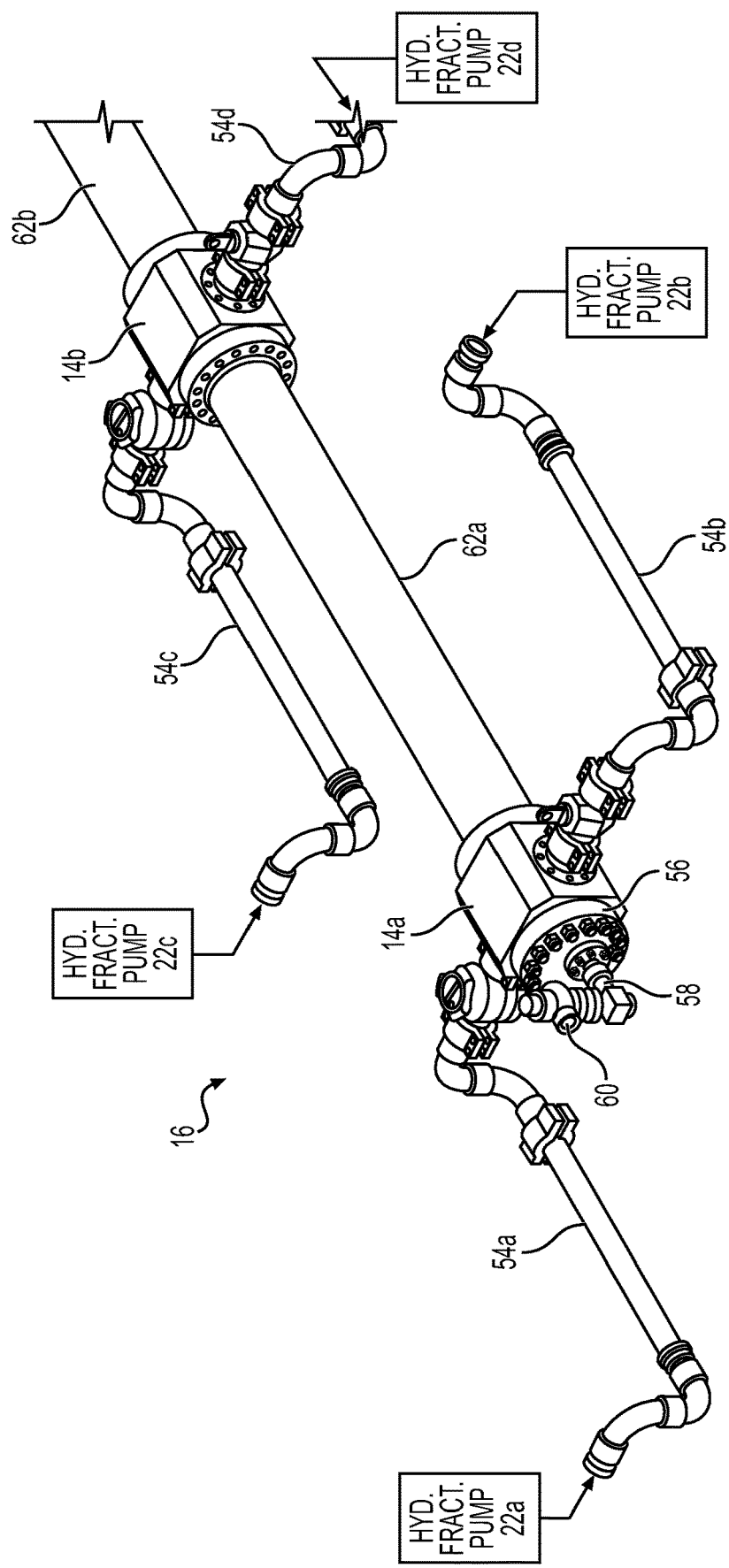
FIG. 2 is a partial perspective view of a portion of an example manifold assembly according to embodiments of the disclosure.

FIG. 2 is a partial perspective view of a portion of an example manifold assembly 16 according to embodiments of the disclosure. As shown in FIGS. 1 and 2, each of the hydraulic fracturing units 12 may be configured to supply fracturing fluid under high pressure and/or high flow rates to the manifold assembly 16, which provides a flow passage between the respective hydraulic fracturing pumps 16 and the wellhead manifold 44 (see FIG. 1) to supply the fracturing fluid under high pressure to a wellbore during a fracturing operation. As shown in FIGS. 1 and 2, each of the respective hydraulic fracturing pumps 16 may provide a supply of hydraulic fracturing fluid to the manifold assembly 16 (e.g., a high-pressure manifold assembly) via a respective flow iron section 54, for example, flow iron sections 54a, 54b, 54c, and 54d shown in FIG. 2. Each of the flow iron sections 54 may include respective passages that may be connected at a first end to an output of a respective one of the hydraulic fracturing pumps 16 and at an opposite, remote or second end, a respective manifold coupling 14, for example, manifold couplings 14a and 14b shown in FIG. 2. As shown in FIG. 2, a first one of the manifold couplings 14a may be an end coupling, which acts as a first coupling in a sequence of a plurality of manifold couplings 14, for example, with a remainder of the manifold couplings 14 being downstream relative to the end coupling. In some embodiments, the end coupling may have the same (or similar) configuration as the remainder of the downstream manifold couplings 14, and an end plate 56 may be connected to the end coupling to close a manifold passage in the manifold coupling. In some embodiments, the end plate 56 may include a port to receive a coupling 58 and/or a valve 60 configured to provide pressure relief and/or to prime the manifold assembly 16.

In some embodiments, the manifold assembly 16 may be configured to provide a common conduit to receive fracturing fluid at high pressure and/or high flow rates from the hydraulic fracturing pumps 22 and convey the fracturing fluid to the wellbore at a desired pressure and/or flow rate. The manifold assembly 16 may include a plurality of the manifold couplings 14 that receive the respective fracturing fluid outputs from the hydraulic fracturing pumps 22 and consolidate the fracturing fluid into the manifold assembly 16. In some embodiments, one or more of the manifold couplings 14 may be configured to receive fracturing fluid outputs from two, three, four, or more of the hydraulic fracturing pumps 22.

As shown in FIG. 2, in some embodiments, the manifold assembly 16 may include a plurality of manifold sections 62, for example, manifold sections 62a and 62b shown in FIG. 2, and the manifold sections 62 may be connected to one another via the manifold couplings 14. For example, as shown, the first manifold coupling 14a is connected to a first end of a first manifold section 62a of the plurality of manifold sections 62, and a second end opposite the first end of the first manifold section 62a is connected to the second manifold coupling 14b. A first end of a second manifold section 62b of the plurality of manifold sections 62 is connected to the second manifold coupling 14b, and a second end opposite the first end of the second manifold section 62b may be connected to another one of the manifold couplings 14. In some embodiments, the manifold assembly 16 may include two or more of the manifold sections 62, and the manifold sections 62 may be connected to one another in an end-to-end manner via two or more of the manifold couplings 14, thereby providing fluid flow between a plurality of the hydraulic fracturing pumps 22 (e.g., hydraulic fracturing pumps 22a, 22b, 22c, 22d, etc., as shown) of a plurality of corresponding hydraulic fracturing units 12 and the wellhead manifold 44 (see FIG. 1).

Figure 3:
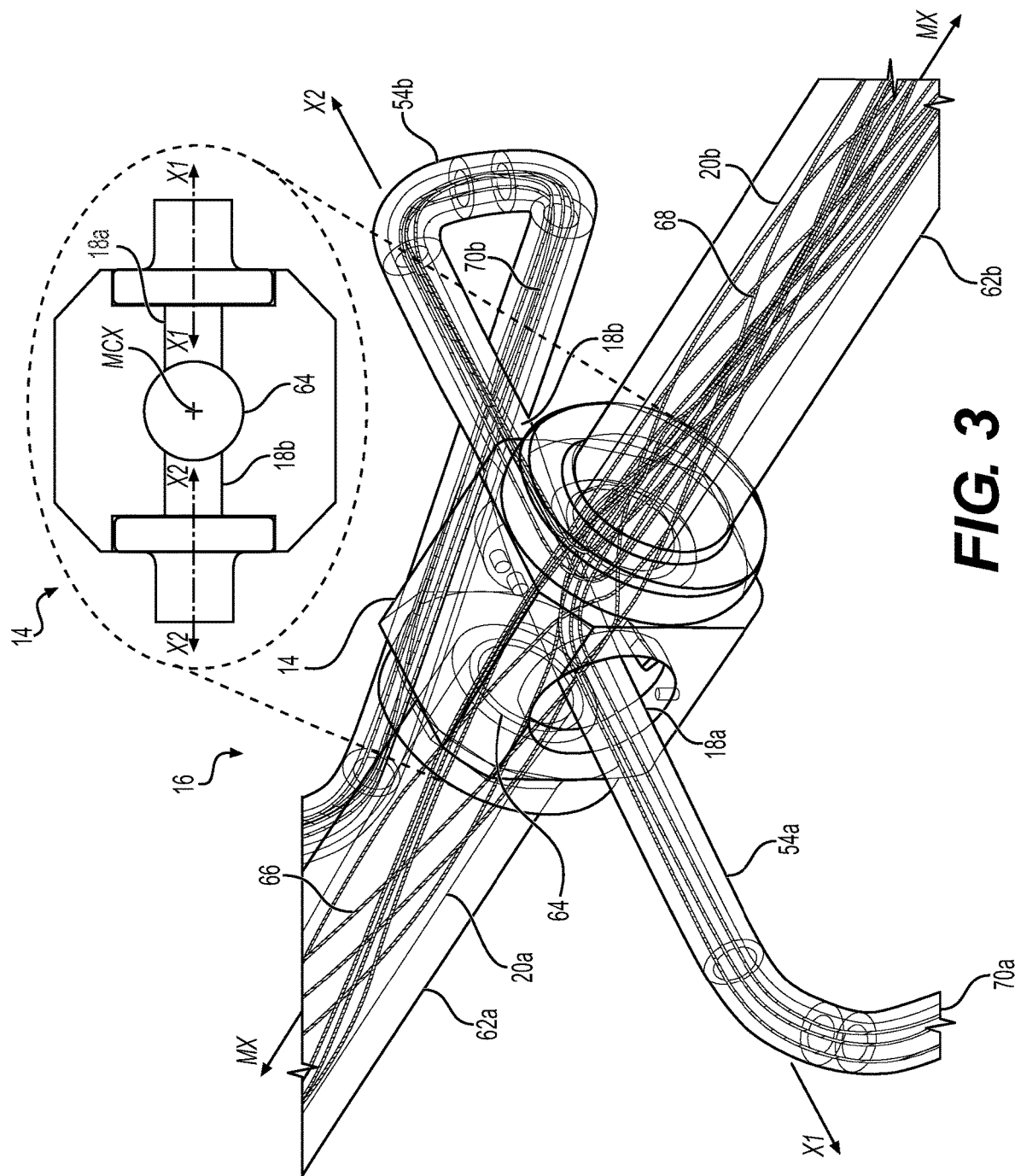
FIG. 3 is a schematic flow diagram depicting a manifold coupling including an example of a relative lack of promotion of swirling of fracturing fluid downstream of the manifold coupling.

FIG. 3 is a schematic flow diagram depicting a manifold coupling 14 including an example of a relative lack of promotion of swirling of fracturing fluid downstream of the manifold coupling 14. As shown in FIG. 3, two manifold sections 62a and 62b are connected to one another via a manifold coupling 14. Each of the manifold sections 62a and 62b includes a manifold passage 20 (20a and 20b as shown in FIG. 3) having a manifold cross-section and a manifold axis MX extending longitudinally along a length of the manifold section 62, and the manifold axis MX is substantially centrally located within the manifold cross-section. The manifold coupling 14 is connected to each of the manifold sections 62a and 62b, and the manifold coupling 14 includes a manifold coupling passage 64 having a coupling passage cross-section defining a coupling passage shape and a coupling passage size substantially in common with the manifold cross-section and the manifold axis MX of the manifold passage 20 of each of the manifold sections 62a and 62b. As shown in FIG. 3, the manifold coupling 14 includes a first inlet passage 18a positioned to provide fluid flow between a first fracturing fluid output of a first hydraulic fracturing pump and the manifold passage 20. As shown in FIG. 3, the first inlet passage 18a has a first inlet passage cross-section defining a first inlet axis X1 extending transverse relative to the manifold axis MX of the manifold sections 62a and 62b. The manifold coupling 14 shown in FIG. 3 also includes a second inlet passage 18b positioned opposite the first inlet passage 18a to provide fluid flow between a second fracturing fluid output of a second hydraulic fracturing pump and the manifold passage 20. The second inlet passage 18b has a second inlet passage cross-section defining a second inlet axis X2 extending transverse relative to the manifold axis MX and co-linear with respect to the first inlet axis X1.

In some embodiments, the manifold sections 62 may have different lengths, different inside diameters, and/or different manifold coupling inlet passage orientations. In some embodiments, the manifold sections 62 and/or manifold couplings 14 may be configured to have a manifold passage 20 and manifold coupling passage 64 having a cross-section that is of a substantially constant cross-sectional size and a substantially constant cross-sectional shape, which may form a manifold assembly 16 sometimes referred to as a "mono-bore" manifold. In some such embodiments, the manifold sections 62 and manifold couplings 14 consolidate the fracturing fluid flow from the hydraulic fracturing pumps 22. Applicant has recognized that in some such embodiments, the manifold assembly 16 may damp pressure pulsations resulting from the outputs of the hydraulic fracturing pumps 22. The pressure pulsations are generated during operation of the hydraulic fracturing pumps 22 and the pressure pulsations may travel downstream into the manifold assembly 16, including the manifold sections 62. Each of the hydraulic fracturing pumps 22 may generate cyclic pressure pulsations, each having distinct amplitudes and/or distinct frequencies. Damping of the pressure pulsations by the manifold assembly 16 may result from one or more of the increased volume of fracturing fluid trapped inside the manifold assembly 16, allowing some energy dissipation of the pressure pulses, the spacing and/or orientation of the inlet passages of the manifold couplings 14, mechanical damping around the manifold couplings 14 and/or manifold sections 62, or the respective lengths, configurations, and/or materials of the fracturing fluid conduits (e.g., the flow iron sections 54, the inlet passages 18, and/or the manifold sections 62), which may affect acoustic responses of the manifold assembly 16.

During operation of the hydraulic fracturing pumps 22, in some embodiments, cyclic movement of the plungers may generate the high-pressure pulsations, which may increase energy intensity inside the manifold assembly 16, for example, in relation to the manifold couplings 14 at the inlet passages 18. The energy intensity may induce high vibration amplitudes that, in turn, may increase the possibility of fatigue stress failures in components of the hydraulic fracturing system 10, for example, including the hydraulic fracturing pumps 22, the manifold assembly 16, including the related connections.

Without wishing to be bound by theory, Applicant believes that a contributing factor to the increased energy intensity may result from the manner in which the manifold couplings 14 are spaced and oriented relative to the manifold sections 62. For example, inlet passages 18 of the manifold couplings 14 may be aligned with the manifold passage 20 of the manifold sections 62, such that the respective centers of the inlet passages 18 are aligned with the center of the manifold passage 20, for example, as shown in FIG. 3. Applicant believes that this arrangement may result in a magnification of the pressure pulsation force, possibly because orientation of the inlet passages 18, opposite and aligned with one another relative to the manifold passage 20, may result in flow of fracturing fluid from the respective inlet passages 18 into the manifold passage 20 colliding directly with or obstructing one another, for example, once subsequent pressure pulses and/or flow pulses from upstream relative to the manifold coupling 14 reach the manifold coupling 14 and are combined with the fracturing fluid flowing into the manifold coupling 14 via the inlet passages 18. This, in turn, may create relatively large collisions of high-pressure fracturing fluids, which may have similar momentum, and this may result in a relatively high concentration of pressure increase at the inlet passages 18 of the manifold couplings 14.

Without wishing to be bound by theory, Applicant believes that fluid flow turbulence may be disturbed when the inlet passages of a manifold coupling 14 are in a concentric and/or aligned configuration. It is believed by Applicant that this may result in the generation of relatively smaller-scaled vortex flow or "swirls", which may, in turn, decrease any fluid viscous damping of the pressure pulses and related fluid energy. This, in turn, may result in inducing and/or amplifying vibration in the manifold assembly 16.

As schematically depicted in FIG. 3, upstream flow 66 of the fracturing fluid passes through the manifold coupling passage 64 of the manifold coupling 14 and continues as downstream flow 68 after passing through the manifold coupling 14. A first output flow 70a from a first output of a first hydraulic fracturing pump flows into the manifold coupling 14 via a first flow iron section 54a and a first inlet passage 18a of the manifold coupling 14. Similarly, a second output flow 70b from a second output of a second hydraulic fracturing pump flows into the manifold coupling 14 via a second flow iron section 54b and a second inlet passage 18b of the manifold coupling 14. As schematically depicted in FIG. 3, the upstream flow 66 and the downstream flow 68 are such that the flow of the fracturing fluid is not significantly swirling and thus is not significantly turbulent. Entry of the first output flow 70a and the second output flow 70b into the manifold coupling 14 does not cause significant swirling or turbulence in the downstream flow 68. This, in turn, may result in inducing and/or amplifying vibration in the manifold assembly 16.

Figure 4A:
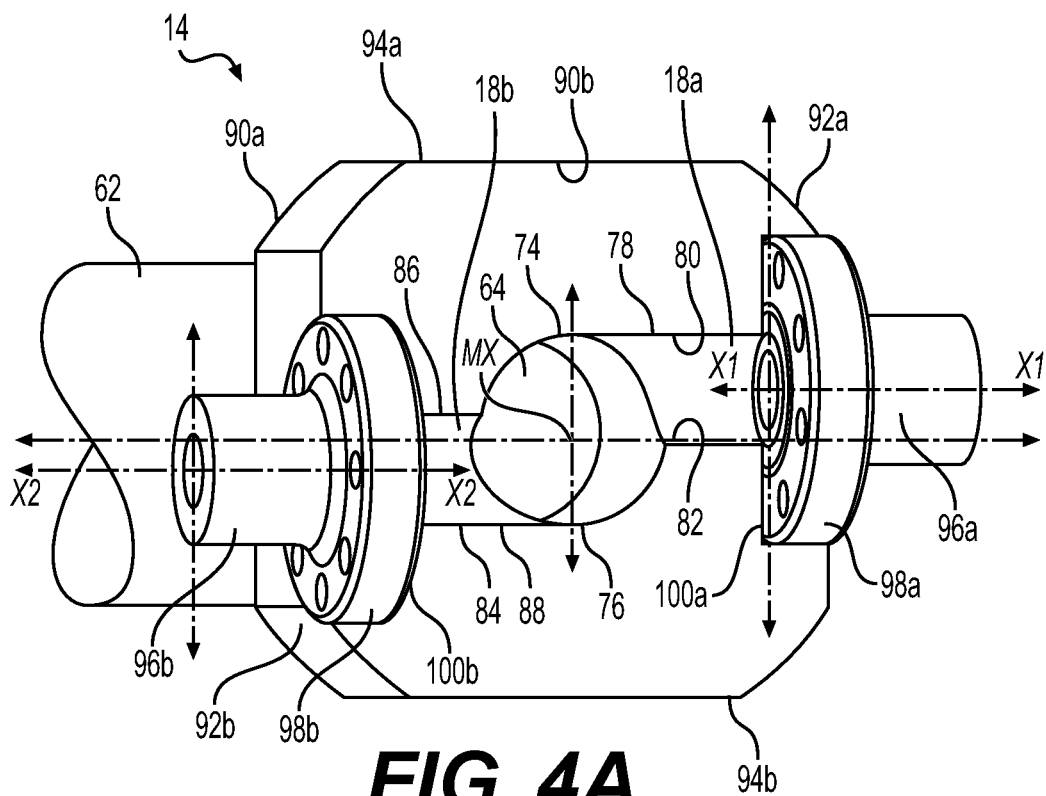
FIG. 4A is a partial perspective section view of an example manifold coupling according to embodiments of the disclosure.
Figure 4B:
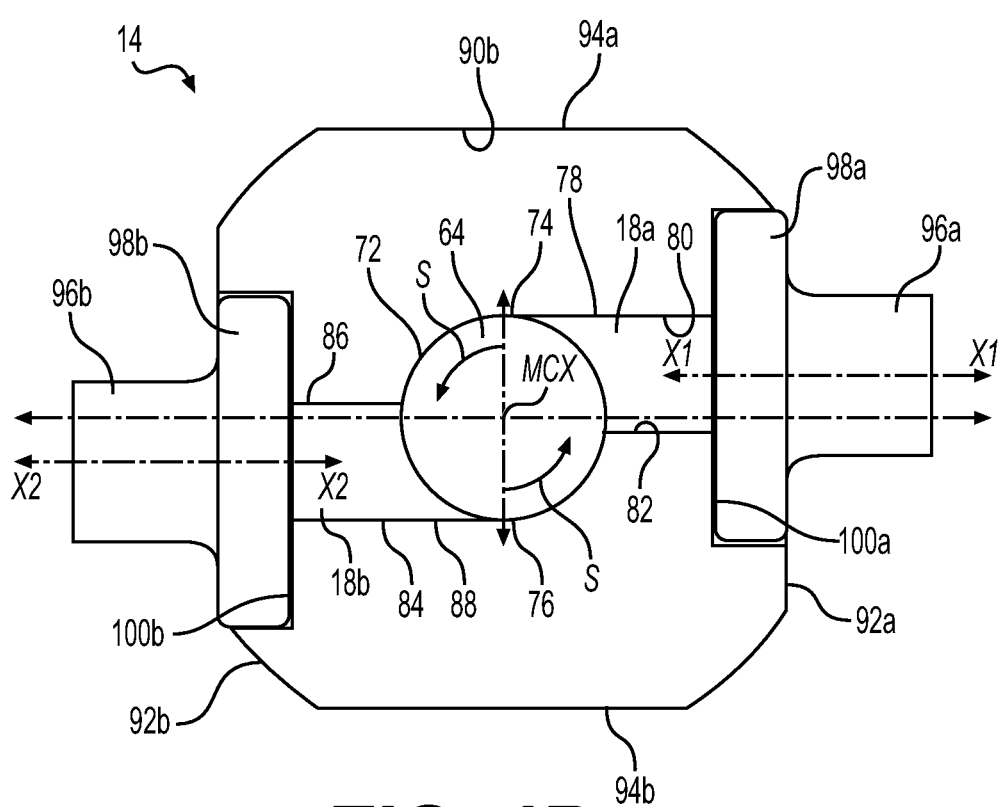
FIG. 4B is a side section view of the example manifold coupling shown in FIG. 4A according to embodiments of the disclosure.

FIG. 4A is a partial perspective section view of an example manifold coupling 14 according to embodiments of the disclosure, and FIG. 4B is a side section view of the example manifold coupling 14 shown in FIG. 4A. In some embodiments, as shown in FIGS. 4A and 4B, the manifold coupling 14 may be connected to one or more manifold sections 62 (see FIG. 2), and the manifold coupling 14 may include a manifold coupling passage 64 having a coupling passage cross-section defining one or more of a coupling passage shape or a coupling passage size substantially in common with the manifold passage shape or a manifold passage size of the manifold cross-section of one or more of the manifold sections 62. In some embodiments, a manifold coupling axis MCX of the manifold coupling 14 may be substantially parallel to the manifold axis MX of the manifold passage 20 of one or more of the manifold sections 62 to which the manifold coupling 14 is attached. As shown, some embodiments of the manifold coupling 14 may include a first inlet passage 18a positioned to provide fluid flow between a first fracturing fluid output of a first hydraulic fracturing pump and the manifold passage 20. The first inlet passage 18*a* may have a first inlet passage cross-section at least partially defining a first inlet axis X1 extending transverse (e.g., perpendicular) relative to the manifold axis MX of the one or more manifold sections 62. As shown, the manifold coupling 14 may also include a second inlet passage 18*b* positioned opposite the first inlet passage 18*a* to provide fluid flow between a second fracturing fluid output of a second hydraulic fracturing pump and the manifold passage 20 of the one or more manifold sections 62. The second inlet passage 18*b* may have a second inlet passage cross-section at least partially defining a second inlet axis X2 extending transverse (e.g., perpendicular) relative to the manifold axis MX of the one or more manifold sections 62.

As shown in FIGS. 4A and 4B, in some embodiments of the manifold coupling 14, the first inlet passage 18*a* and the second inlet passage 18*b* may be oriented relative to one another such that the first inlet axis X1 and the second inlet axis X2 are not co-linear relative to one another. For example, in some embodiments, the first inlet passage 18*a* and the second inlet passage 18*b* may be oriented relative to one another, such that the first inlet axis X1 and the second inlet axis X2 are oriented relative to one another so that fracturing fluid flowing into the manifold passage 20 from the first inlet passage 18*a* and the second inlet passage 18*b* promotes swirling of the fracturing fluid downstream of the manifold coupling 14. In some embodiments, the first inlet axis X1 and the second inlet axis X2 lie in a plane perpendicular to the manifold axis MX, for example, as shown in FIGS. 4A and 4B. In some embodiments, the first inlet axis X1 and the second inlet axis X2 are parallel and offset relative to one another, for example, as shown in FIGS. 4A and 4B (see also FIGS. 6A and 6C).

Without wishing to be bound by theory, Applicant believes that increasing the free vortex flow and forced vortex flow in the manifold passage 20 of the manifold assembly 16 may result in increasing the difference between the radial pressure and/or axial pressure along the wall of the manifold passage 20 and the radial pressure and/or axial pressure at the centerline region of the manifold passage 20. It is believed by Applicant that this may permit the fracturing fluid to dissipate pressure energy, for example, as the fracturing fluid swirls within the manifold passage 20, releasing at least a portion of the pressure energy in the form of, for example, heat and/or viscous shear of the fracturing fluid. This, in turn, may result in improved and/or more efficient pressure pulsation damping inside the manifold passage 20 of the manifold assembly 16. This may result in suppression and/or dissipation of vibration in the manifold assembly 16.

In some embodiments, the promotion of swirling of the fracturing fluid in the manifold passage 20 and/or the manifold assembly 16 in general may improve the level of proppant suspension in the fracturing fluid. For example, the manner in which the fracturing fluid flows through the manifold assembly 16 may affect the homogeneity and/or consistency of the suspension of the proppants in the fracturing fluid pumped through the manifold assembly 16. To the extent that some manifold assemblies may not promote or may inhibit swirling of the fracturing fluid, such manifold assemblies may hinder the homogeneous or consistent suspension of proppants in the fracturing fluid. This may reduce the effectiveness of the proppants.

Figure 5:
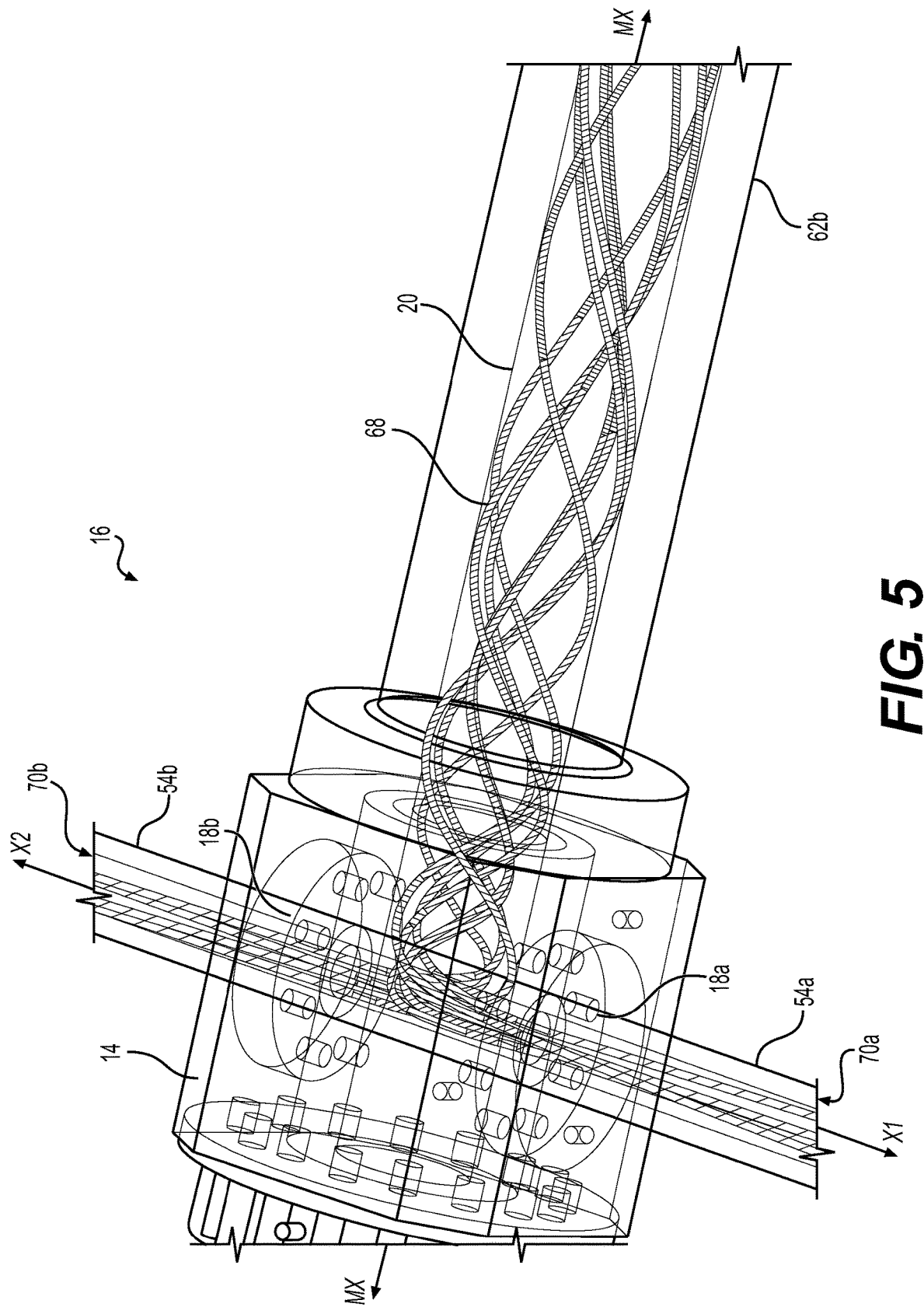
FIG. 5 is a schematic flow diagram depicting an example manifold coupling including an example promotion of swirling of fracturing fluid downstream of the manifold coupling according to embodiments of the disclosure.

In some embodiments, the first inlet axis X1 and the second inlet axis X2 may be oriented relative to one another such that fracturing fluid flowing into the manifold passage 20 from the first inlet passage 18*a* and the second inlet passage 18*b* promotes swirling of the fracturing fluid downstream of the manifold coupling 14, for example, as schematically depicted by the arrows S shown in FIG. 4B. For example, FIG. 5 is a schematic flow diagram depicting an example manifold coupling 14 including an example promotion of swirling of fracturing fluid downstream of the manifold coupling 14 according to embodiments of the disclosure. As shown in FIG. 5, two manifold sections 62*a* and 62*b* are connected to one another via a manifold coupling 14 according to embodiments of the disclosure. Each of the manifold sections 62*a* and 62*b* includes a manifold passage 20 (e.g., manifold passages 20*a* and 20*b* shown in FIG. 5) having a manifold cross-section and a manifold axis MX extending longitudinally along a length of the manifold section 62, and the manifold axis MX may be substantially centrally located within the manifold cross-section. In some embodiments, the manifold coupling 14 may be connected to each of the manifold sections 62*a* and 62*b*, and the manifold coupling 14 may include a manifold coupling passage 64 having a coupling passage cross-section at least partially defining a coupling passage shape and/or a coupling passage size substantially in common with the manifold cross-section and the manifold axis MX of the manifold passage 20 of one or more of the manifold sections 62*a* and 62*b*. As shown in FIG. 5, the manifold coupling 14 may include a first inlet passage 18*a* positioned to provide fluid flow between a first fracturing fluid output of a first hydraulic fracturing pump and the manifold passage 20. The first inlet passage 18*a* may have a first inlet passage cross-section at least partially defining a first inlet axis X1 extending transverse (e.g., perpendicular) relative to the manifold axis MX of the manifold sections 62*a* and 62*b*. The manifold coupling 14 shown in FIG. 5 also may include a second inlet passage 18*b* positioned opposite the first inlet passage 18*a* to provide fluid flow between a second fracturing fluid output of a second hydraulic fracturing pump and the manifold passage 20. The second inlet passage 18*b* may have a second inlet passage cross-section defining a second inlet axis X2 extending transverse (e.g., perpendicular) relative to the manifold axis MX.

As schematically depicted in FIG. 5, upstream flow 66 of the fracturing fluid passes through the manifold coupling passage 64 of the manifold coupling 14 and continues as downstream flow 68 after passing through the manifold coupling 14. A first output flow 70*a* from a first output of a first hydraulic fracturing pump flows into the manifold coupling 14 via a first flow iron section 54*a* and a first inlet passage 18*a* of the manifold coupling 14. Similarly, a second output flow 70*b* from a second output of a second hydraulic fracturing pump flows into the manifold coupling 14 via a second flow iron section 54*b* and a second inlet passage 18*b* of the manifold coupling 14. As schematically depicted in FIG. 5, the upstream flow 66 and the downstream flow 68 are such that swirling of the flow of the fracturing fluid is promoted, for example, as schematically depicted in FIGS. 4B and 5, for example, resulting in the downstream flow 68 flow of the fracturing fluid being significantly turbulent. Thus, entry of the first output flow 70*a* and the second output flow 70*b* into the manifold coupling 14 results in causing significant swirling or turbulence in the downstream flow 68.

As shown in FIGS. 4A and 4B, in some embodiments of the manifold coupling 14, the coupling passage cross-section of the manifold coupling 14 may define an outer manifold coupling perimeter 72 having an upper manifold coupling portion 74 and a lower manifold coupling portion 76 opposite the upper manifold coupling portion 74. In some embodiments, the cross-section of the first inlet passage 18*a* may at least partially define an outer inlet perimeter 78 having an upper inlet portion 80 and a lower inlet portion 82 opposite the upper inlet portion 80. The first inlet passage 18a may intersect the manifold coupling passage 64 such that the upper inlet portion 80 of the first inlet passage 18a substantially coincides with the upper manifold coupling portion 74. In some embodiments, the cross-section of the second inlet passage 18b may at least partially define an outer inlet perimeter 84 having an upper inlet portion 86 and a lower inlet portion 88 opposite the upper inlet portion 86. In some embodiments, the second inlet passage 18b may intersect the manifold coupling passage 64 such that the lower inlet portion 88 of the second inlet passage 18b substantially coincides with the lower manifold coupling portion 76. In some embodiments, this may enhance drainage from the manifold section 62.

For example, in embodiments consistent with those shown in FIGS. 4A, 4B, and 5 (see also FIG. 6B and FIG. 6C), drainage of fracturing fluid from the manifold assembly 16 following a fracturing operation may be enhanced. Because the lower portion of one of the inlet passages 18 is at or below the level of the lowest portion of the manifold passage 20, it may reduce the likelihood or prevent fracturing fluid, including in some instances proppants, from remaining in the manifold assembly 16, the manifold couplings 14, and/or the manifold sections 62. This may reduce payload weight and/or weight distribution imbalances while transporting the components of the manifold assembly 16 to another location for preforming another fracturing operation. This also may inhibit corrosion of components of the manifold assembly 16 that may occur if fracturing fluid remains in the manifold assembly 16. Fracturing fluids may include cementitious and/or corrosive materials that may reduce the service life, damage, and/or create maintenance issues if they remain in the manifold assembly 16 for prolonged periods. In some embodiments, the manifold coupling 14 may reduce the likelihood or prevent such occurrences.

As shown in FIGS. 4A and 5, in some embodiments, the manifold coupling 14 may include three pairs of opposing sides 90a and 90b, 92a and 92b, and 94a and 94b, substantially forming a rectangular prism. The manifold passage 20 may pass through a first pair of the opposing sides 90a and 90b, and a second pair of the opposing sides 92a and 92b may be substantially perpendicular relative to the first pair of opposing sides 90a and 90b. The first inlet passage 18a may extend from a first opposing side 92a of the second pair of opposing sides 92a and 92b to the manifold passage 20, and the second inlet passage 18b may extend from a second opposing side 92b of the second pair of opposing sides 92a and 92b to the manifold passage 20.

As shown in FIGS. 2 and 4A, in some embodiments, the first flow iron section 54a may include a first inlet manifold 96a connected to the manifold coupling 14 and positioned to provide a first fluid flow between a first fracturing fluid output of a first hydraulic fracturing pump and the first inlet passage 18a. In some embodiments, a first coupling flange 98a may connect the first inlet manifold 96a to the manifold coupling 14. For example, the manifold coupling 14 may include a first coupling recess 100a in which the first coupling flange 98a may be at least partially received. The first coupling flange 98a and/or the first coupling recess 100a may have a substantially circular cross-section perpendicular to the first inlet axis X1. In some embodiments, a first coupling seal 102a may be positioned to provide a fluid-tight seal between the first coupling flange 98a and the first coupling recess 100a.

In some embodiments, as shown in FIGS. 2 and 4A, the second flow iron section 54b may include a second inlet manifold 96b connected to the manifold coupling 14 and positioned to provide a second fluid flow between a second fracturing fluid output of a second hydraulic fracturing pump and the second inlet passage 18b. In some embodiments, a second coupling flange 98b may connect the second inlet manifold 96b to the manifold coupling 14. For example, the manifold coupling 14 may include a second coupling recess 100b (e.g., substantially opposite the first coupling recess 100a) in which the second coupling flange 98b may be at least partially received. The second coupling flange 98b and/or the second coupling recess 100b may have a substantially circular cross-section perpendicular to the second inlet axis X2. In some embodiments, a second coupling seal 102b may be positioned to provide a fluid-tight seal between the second coupling flange 98b and the second coupling recess 100b.

Figure 6A:
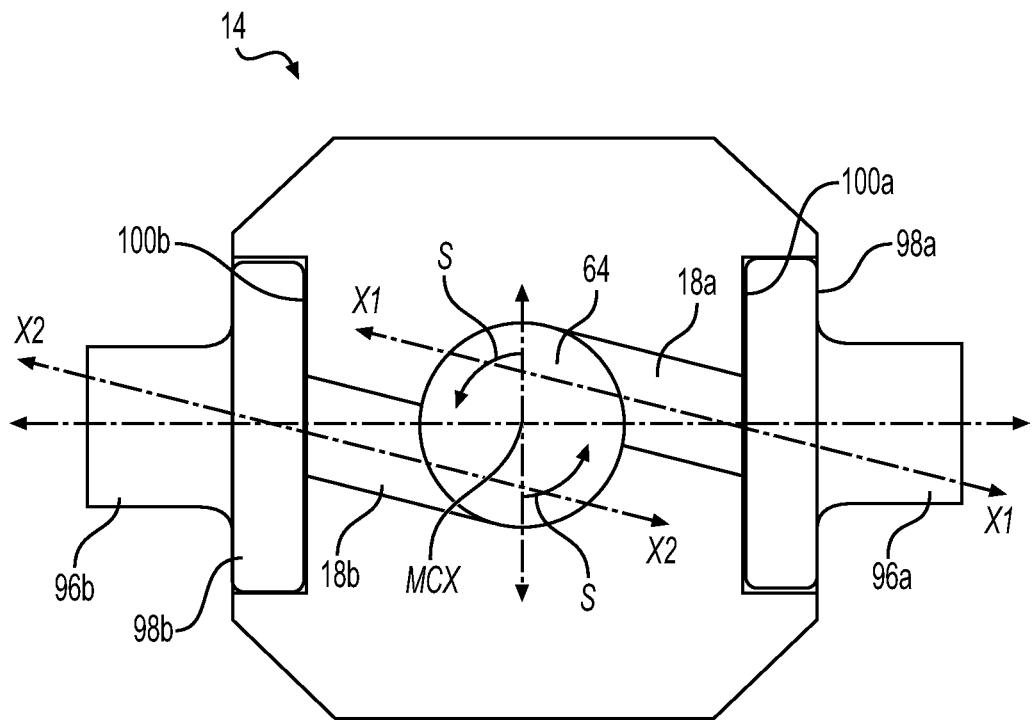
FIG. 6A is a side section view of another example manifold coupling according to embodiments of the disclosure.

FIG. 6A is a side section view of another example manifold coupling 14 according to embodiments of the disclosure. As shown in FIG. 6A, in some embodiments, the manifold coupling 14 may be configured such that the first inlet axis X1 and the second inlet axis X2 of the first inlet passage 18a and the second inlet passage 18b, respectively, are parallel and offset relative to one another. As shown in FIG. 6A, the first inlet axis X1 and the second inlet axis X2 may be oriented relative to one another such that fracturing fluid flowing into manifold coupling passage 64 from the first inlet passage 18a and the second inlet passage 18b promotes swirling of the fracturing fluid downstream of the manifold coupling 14, for example, as schematically depicted by the arrows S shown in FIG. 6A.

Figure 6B:
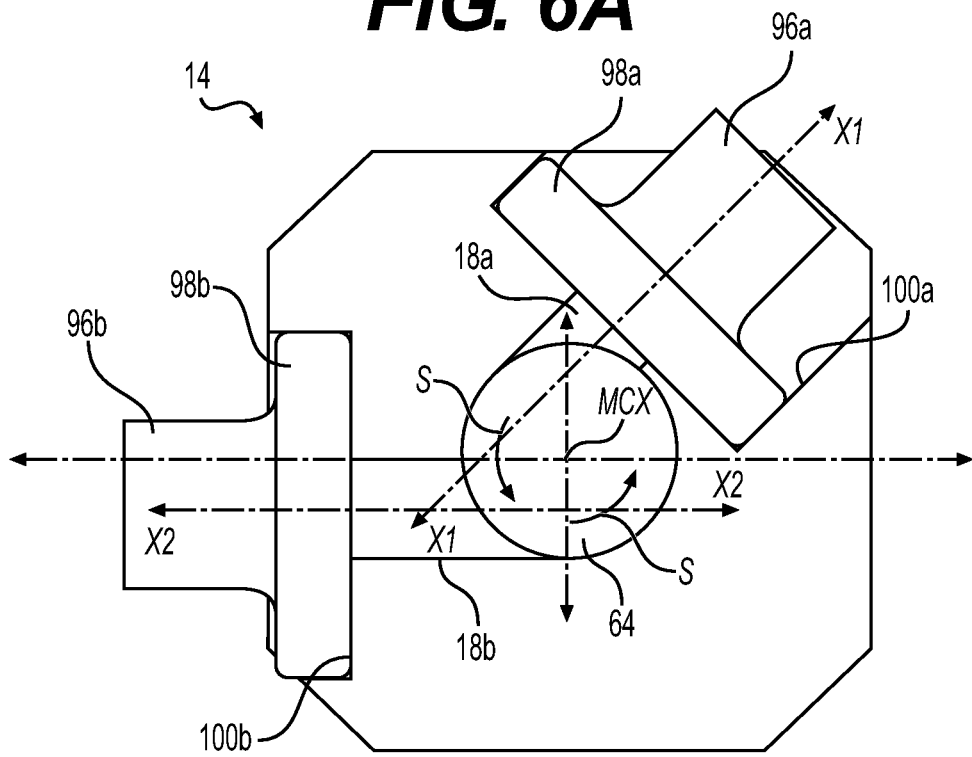
FIG. 6B is a side section view of a further example manifold coupling according to embodiments of the disclosure.

FIG. 6B is a side section view of a further example manifold coupling 14 according to embodiments of the disclosure. As shown in FIG. 6B, in some embodiments, the manifold coupling 14 may be configured such that the first inlet axis X1 and the second inlet axis X2 of the first inlet passage 18a and the second inlet passage 18b, respectively, are not parallel relative to one another. As shown in FIG. 6B, in some embodiments, the first inlet axis X1 and the second inlet axis X2 lie in a common plane, but are not parallel relative to one another. As shown in FIG. 6B, the first inlet axis X1 and the second inlet axis X2 may be oriented relative to one another such that fracturing fluid flowing into manifold coupling passage 64 from the first inlet passage 18a and the second inlet passage 18b promotes swirling of the fracturing fluid downstream of the manifold coupling 14, for example, as schematically depicted by the arrows S shown in FIG. 6B. In some embodiments, the first inlet axis X1 and the second inlet axis X2 may be skew relative to one another, for example, being neither parallel to one another nor intersecting one another (e.g., not lying in a common plane relative to one another), but oriented relative to one another such that fracturing fluid flowing into manifold coupling passage 64 from the first inlet passage 18a and the second inlet passage 18b promotes swirling of the fracturing fluid downstream of the manifold coupling 14.

Figure 6C:
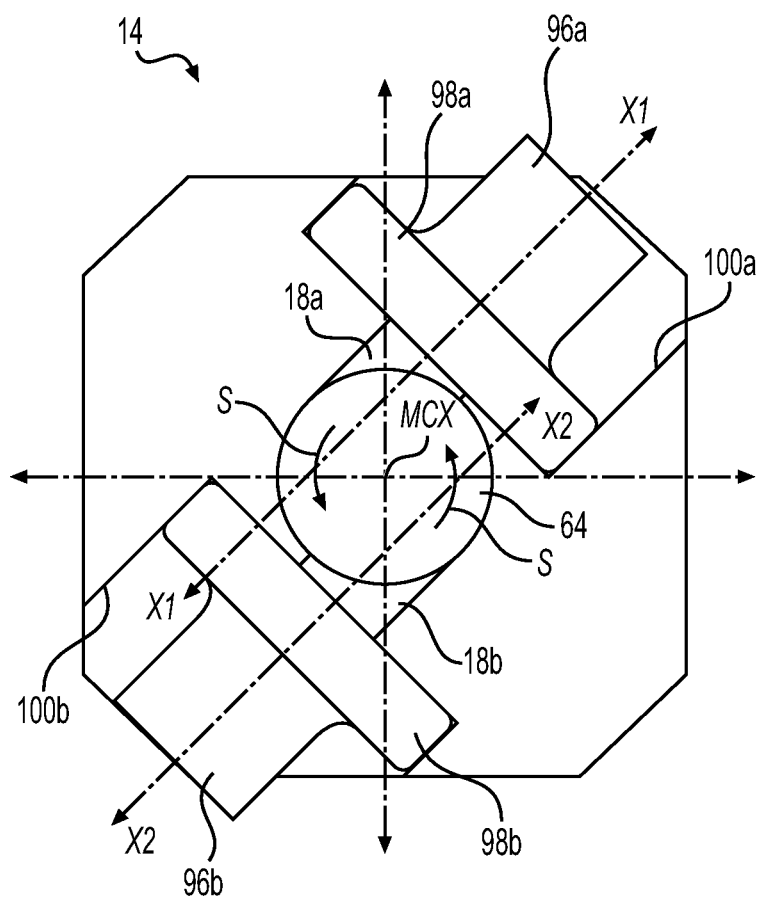
FIG. 6C is a side section view of still a further example manifold coupling according to embodiments of the disclosure.

FIG. 6C is a side section view of still a further example manifold coupling 14 according to embodiments of the disclosure. As shown in FIG. 6C, in some embodiments, the manifold coupling 14 may be configured such that the first inlet axis X1 and the second inlet axis X2 of the first inlet passage 18a and the second inlet passage 18b, respectively, are parallel and offset relative to one another. For example, in some embodiments, as shown in FIG. 6C, a manifold coupling cross-section of the manifold coupling 14 perpendicular to the manifold axis MX may at least partially define two pairs of opposing sides, and the first inlet axis X1 and the second inlet axis X2 are oblique with respect to one or more of the two pairs of opposing sides. As shown in FIG. 6C, the first inlet axis X1 and the second inlet axis X2 may be oriented relative to one another such that fracturing fluid flowing into manifold coupling passage 64 from the first inlet passage 18*a* and the second inlet passage 18*b* promotes swirling of the fracturing fluid downstream of the manifold coupling 14, for example, as schematically depicted by the arrows S shown in FIG. 6C.

Figure 7:
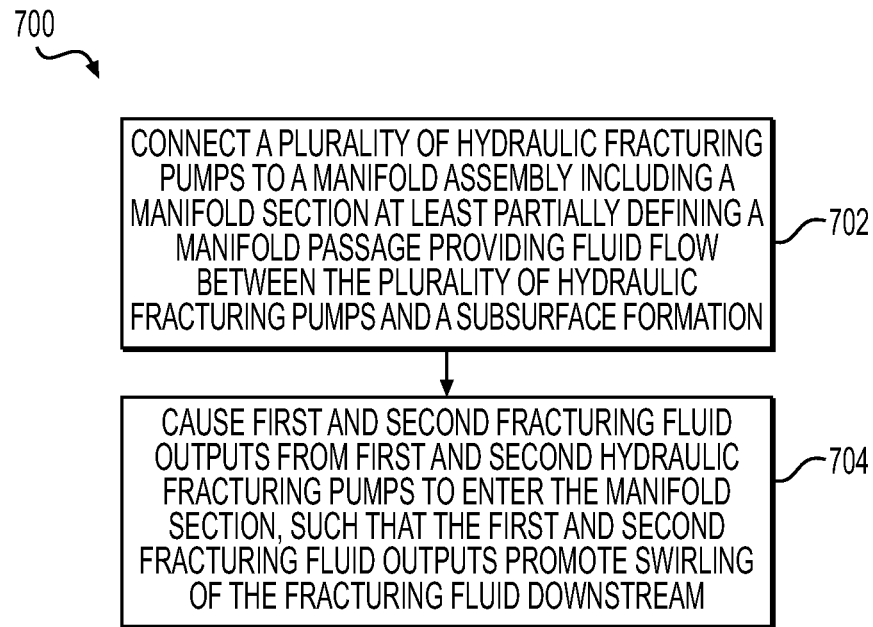
FIG. 7 is a block diagram of an example method to enhance fracturing fluid flow between a plurality of hydraulic fracturing pumps and a subsurface formation, according to embodiments of the disclosure.
Figure 8:
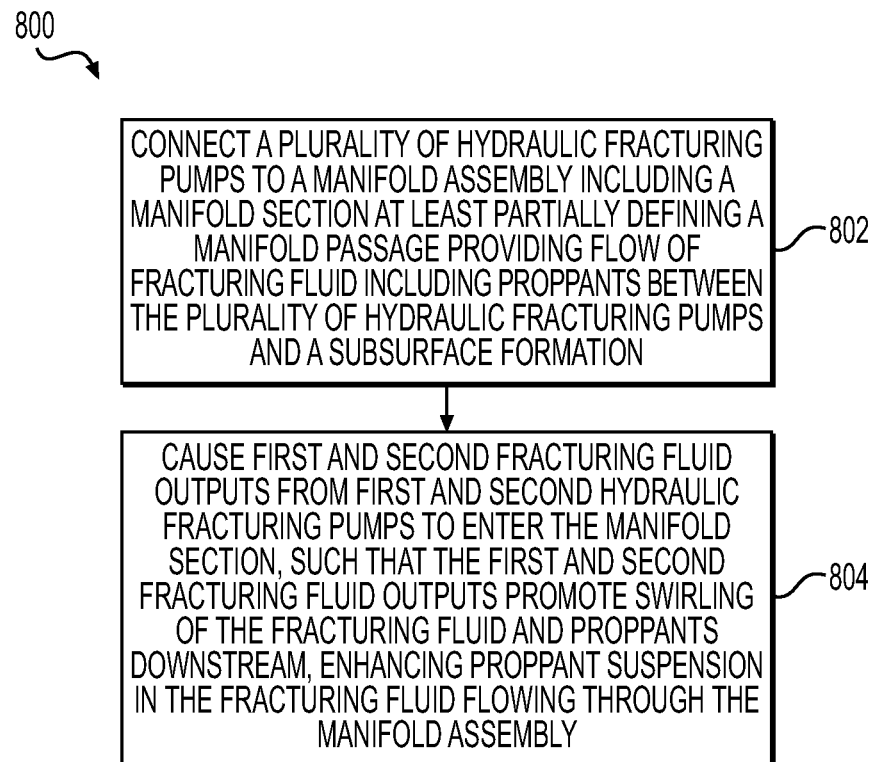
FIG. 8 is a block diagram of an example method to enhance suspension of proppants in fracturing fluid during a high-pressure fracturing operation, according to embodiments of the disclosure.
Figure 9:
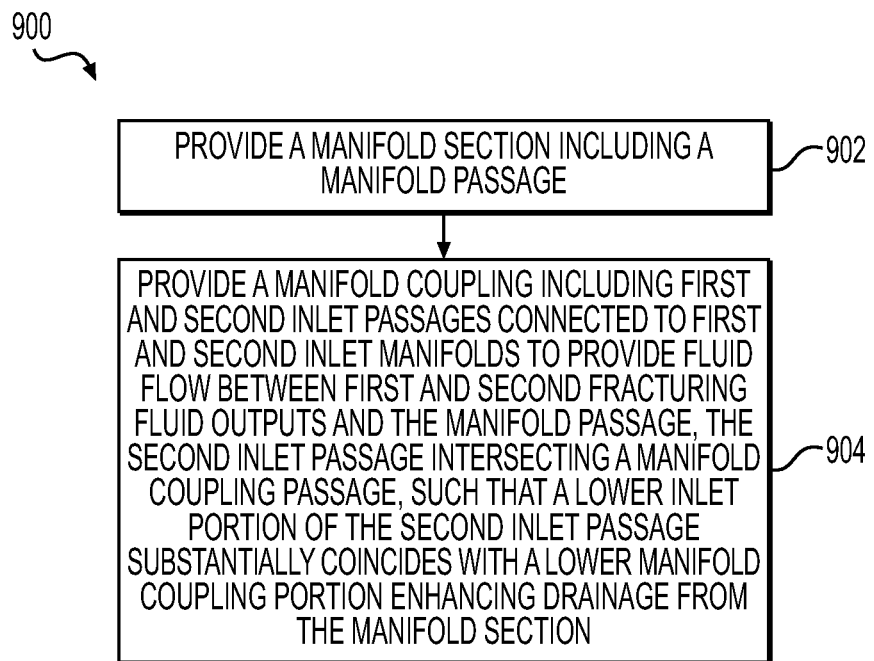
FIG. 9 is a block diagram of an example method to enhance drainage of fracturing fluid from a manifold assembly following a high-pressure fracturing operation, according to embodiments of the disclosure.

FIG. 7, FIG. 8, and FIG. 9 show block diagrams of example methods 700, 800, and 900 according to embodiments of the disclosure, illustrated as respective collections of blocks in logical flow graphs, which represent a sequence of operations. FIG. 7 is a block diagram of an example method 700 to enhance fracturing fluid flow between a plurality of hydraulic fracturing pumps and a subsurface formation to enhance hydrocarbon production from the subsurface formation, according to embodiments of the disclosure. FIG. 8 is a block diagram of an example method 800 to enhance suspension of proppants in fracturing fluid during a high-pressure fracturing operation, according to embodiments of the disclosure. FIG. 9 is a block diagram of an example method 900 to enhance drainage of fracturing fluid from a manifold assembly following a high-pressure fracturing operation, according to embodiments of the disclosure. For each of the respective example methods, the order in which the operations are described is not intended to be construed as a limitation, and any number of the described blocks may be combined in any order and/or in parallel to implement the method.

FIG. 7 is a block diagram of an example method 700 to enhance fracturing fluid flow between a plurality of hydraulic fracturing pumps and a subsurface formation to enhance hydrocarbon production from the subsurface formation, according to embodiments of the disclosure. As shown in FIG. 7, the example method 700, at 702, may include connecting a plurality of hydraulic fracturing pumps to a manifold assembly including a manifold section at least partially defining a manifold passage providing fluid flow between the plurality of hydraulic fracturing pumps and the subsurface formation.

At 704, the example method 700 may include causing a first fracturing fluid output from a first hydraulic fracturing pump of the plurality of hydraulic fracturing pumps and a second fracturing fluid output from a second hydraulic fracturing pump of the plurality of hydraulic fracturing pumps to enter the manifold section, such that the first fracturing fluid output and the second fracturing fluid output promote swirling of the fracturing fluid downstream of the first fracturing fluid output and the second fracturing fluid output entering the manifold passage.

For example, causing the first fracturing fluid output and the second fracturing fluid output to enter the manifold section may include providing a first inlet passage connected to a first inlet manifold and positioned to provide fluid flow between the first fracturing fluid output and the manifold passage. The first inlet passage may have a first inlet passage cross-section at least partially defining a first inlet axis extending transverse relative to the manifold passage. Causing the first fracturing fluid output and the second fracturing fluid output to enter the manifold section may include providing a second inlet passage connected to a second inlet manifold and positioned to provide fluid flow between the second fracturing fluid output and the manifold passage. The second inlet passage may have a second inlet passage cross-section at least partially defining a second inlet axis extending transverse relative to the manifold axis and not being co-linear with the first inlet axis. For example, the first inlet axis and the second inlet axis may lie in a plane perpendicular to the manifold axis. For example, the first inlet axis and the second inlet axis may be parallel and offset relative to one another, for example, as described herein.

In some examples of the method 700, the coupling passage cross-section may at least partially define an outer manifold coupling perimeter having opposite manifold coupling portions. The first inlet passage cross-section may at least partially define an outer inlet perimeter having opposite inlet portions. The first inlet passage may intersect the manifold coupling passage such that one of the opposite inlet portions of the first inlet passage substantially coincides with a first manifold coupling portion of the opposite manifold coupling portions. The second inlet passage cross-section may at least partially define an outer inlet perimeter having opposite inlet portions. The second inlet passage may intersect the manifold coupling passage such that one of the opposite inlet portions of the second inlet passage substantially coincides with a second manifold coupling portion of the opposite manifold coupling portions. The first inlet axis and the second inlet axis may lie in a common plane without being parallel relative to one another. The first inlet axis and the second inlet axis may be skew relative to one another, for example, as described herein.

FIG. 8 is a block diagram of an example method 800 to enhance suspension of proppants in fracturing fluid during a high-pressure fracturing operation, according to embodiments of the disclosure. At 802, the example method 800 may include connecting a plurality of hydraulic fracturing pumps to a manifold assembly including a manifold section at least partially defining a manifold passage providing flow of fracturing fluid including proppants between the plurality of hydraulic fracturing pumps and the subsurface formation.

At 804, the example method 800 may include causing a first fracturing fluid output from a first hydraulic fracturing pump of the plurality of hydraulic fracturing pumps and a second fracturing fluid output from a second hydraulic fracturing pump of the plurality of hydraulic fracturing pumps to enter the manifold section, such that the first fracturing fluid output and the second fracturing fluid output promote swirling of the fracturing fluid and proppants downstream of the first fracturing fluid output and the second fracturing fluid output entering the manifold passage. For example, causing the first fracturing fluid output and the second fracturing fluid output to enter the manifold section may include providing a first inlet passage connected to a first inlet manifold and positioned to provide fluid flow between the first fracturing fluid output and the manifold passage, and the first inlet passage may have a first inlet passage cross-section at least partially defining a first inlet axis extending transverse relative to the manifold passage. Causing the first fracturing fluid output and the second fracturing fluid output to enter the manifold section further may include providing a second inlet passage connected to a second inlet manifold and positioned to provide fluid flow between the second fracturing fluid output and the manifold passage, and the second inlet passage may have a second inlet passage cross-section at least partially defining a second inlet axis extending transverse relative to the manifold axis and not being co-linear with the first inlet axis, for example, as described herein.

In some examples of the method 800, the coupling passage cross-section may at least partially define an outer manifold coupling perimeter having opposite manifold coupling portions. The first inlet passage cross-section may at least partially define an outer inlet perimeter having opposite inlet portions. The first inlet passage may intersect the manifold coupling passage such that one of the opposite inlet portions of the first inlet passage substantially coincides with a first manifold coupling portion of the opposite manifold coupling portions. The second inlet passage cross-section may at least partially define an outer inlet perimeter having opposite inlet portions. The second inlet passage may intersect the manifold coupling passage such that one of the opposite inlet portions of the second inlet passage substantially coincides with a second manifold coupling portion of the opposite manifold coupling portions.

FIG. 9 is a block diagram of an example method 900 to enhance drainage of fracturing fluid from a manifold assembly following a high-pressure fracturing operation, according to embodiments of the disclosure. At 902, the example method 900 may include providing a manifold section including a manifold passage having a manifold cross-section and a manifold axis extending longitudinally along a length of the manifold section, the manifold axis being substantially centrally located within the manifold cross-section. The example method 900 further ay include providing a manifold coupling including a first inlet passage connected to a first inlet manifold and positioned to provide fluid flow between a first fracturing fluid output and the manifold passage. The first inlet passage may have a first inlet passage cross-section at least partially defining a first inlet axis extending transverse relative to the manifold passage. The manifold coupling further may include a second inlet passage connected to a second inlet manifold and positioned to provide fluid flow between a second fracturing fluid output and the manifold passage. The second inlet passage may have a second inlet passage cross-section at least partially defining a second inlet axis extending transverse relative to the manifold axis. In some embodiments of the method 900, the coupling passage cross-section may at least partially define an outer manifold coupling perimeter having an upper manifold coupling portion and a lower manifold coupling portion opposite the upper manifold coupling portion. The first inlet passage cross-section may at least partially define an outer inlet perimeter having an upper inlet portion and a lower inlet portion opposite the upper inlet portion. The first inlet passage may intersect the manifold coupling passage such that the upper inlet portion of the first inlet passage substantially coincides with the upper manifold coupling portion. The second inlet passage cross-section may at least partially define an outer inlet perimeter having an upper inlet portion and a lower inlet portion opposite the upper inlet portion, and the second inlet passage may intersect the manifold coupling passage such that the lower inlet portion of the second inlet passage substantially coincides with the lower manifold coupling portion, enhancing drainage from the manifold section.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems, methods, and or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

This is a continuation of U.S. Non-Provisional application Ser. No. 17/670,694, filed Feb. 14, 2022, titled "METHODS, SYSTEMS, AND DEVICES TO ENHANCE FRACTURING FLUID DELIVERY TO SUBSURFACE FORMATIONS DURING HIGH-PRESSURE FRACTURING OPERATIONS," which is a continuation of U.S. Non-Provisional application Ser. No. 17/509,292, filed Oct. 25, 2021, titled "METHODS, SYSTEMS, AND DEVICES TO ENHANCE FRACTURING FLUID DELIVERY TO SUBSURFACE FORMATIONS DURING HIGH-PRESSURE FRACTURING OPERATIONS," now U.S. Pat. No. 11,365,615, issued Jun. 21, 2022, which is a continuation of U.S. Non-Provisional application Ser. No. 17/509,252, filed Oct. 25, 2021, titled "METHODS, SYSTEMS, AND DEVICES TO ENHANCE FRACTURING FLUID DELIVERY TO SUBSURFACE FORMATIONS DURING HIGH-PRESSURE FRACTURING OPERATIONS," now U.S. Pat. No. 11,255,175, issued Feb. 22, 2022, which is a continuation of U.S. Non-Provisional application Ser. No. 17/303,150, filed May 21, 2021, titled "METHODS, SYSTEMS, AND DEVICES TO ENHANCE FRACTURING FLUID DELIVERY TO SUBSURFACE FORMATIONS DURING HIGH-PRESSURE FRACTURING OPERATIONS," now U.S. Pat. No. 11,193,361, issued Dec. 7, 2021, which is a continuation of U.S. Non-Provisional application Ser. No. 17/303,146, filed May 21, 2021, titled "METHODS, SYSTEMS, AND DEVICES TO ENHANCE FRACTURING FLUID DELIVERY TO SUBSURFACE FORMATIONS DURING HIGH-PRESSURE FRACTURING OPERATIONS," now U.S. Pat. No. 11,193,360, issued Dec. 7, 2021, which claims priority to and the benefit of U.S. Provisional Application No. 63/201,721, filed May 11, 2021, titled "METHODS, SYSTEMS, AND DEVICES TO ENHANCE FRACTURING FLUID DELIVERY TO SUBSURFACE FORMATIONS DURING HIGH-PRESSURE FRACTURING OPERATIONS," and U.S. Provisional Application No. 62/705,850, filed Jul. 17, 2020, titled "METHODS, SYSTEMS, AND DEVICES FOR ENERGY DISSIPATION AND PROPPANT SUSPENSION BY INDUCED VORTEX FLOW IN MONO-BORE MANIFOLDS," the disclosures of which are incorporated herein by reference in their entirety.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further may be made thereto without departing from the spirit and scope of the present disclosure as set forth in the appended claims.

What is claimed is:

1. A fracturing assembly comprising:
 a plurality of pumps positioned to pump fluid into a subsurface formation;

a manifold assembly positioned to supply fluid from two or more of the plurality of pumps to the subsurface formation;

a first inlet manifold positioned to provide fluid flow between a first one of the plurality of pumps and the manifold assembly; and a second inlet manifold positioned to provide fluid flow between a second one of the plurality of pumps and the manifold assembly, the manifold assembly including:

a manifold section having a manifold passage, the manifold passage having a manifold cross-section and a manifold axis extending longitudinally along a length of the manifold section;

a manifold coupling connected to the manifold section, the manifold coupling having:

a manifold coupling passage having a coupling passage cross-section defining one or more of a coupling passage shape or a coupling passage size substantially in common with one or more of a manifold passage shape or a manifold passage size of the manifold cross-section, a manifold coupling axis extending parallel to the manifold axis, a first inlet passage connected to the first inlet manifold and positioned to provide fluid flow between a first fluid output of the first pump and the manifold passage, and a second inlet passage connected to the second inlet manifold and positioned to provide fluid flow between a second fluid output of the second pump and the manifold passage, such that fluid flowing into the manifold passage from the first inlet passage and the second inlet passage promotes swirling of the fluid downstream of the manifold coupling.

2. The fracturing assembly of claim 1, wherein one or more of the first inlet axis or the second inlet axis is substantially perpendicular relative to the manifold axis.

3. The fracturing assembly of claim 1, wherein the first inlet axis and the second inlet axis lie in a plane substantially perpendicular to the manifold axis.

4. The fracturing assembly of claim 1, wherein the first inlet axis and the second inlet axis are substantially parallel and offset relative to one another.

5. The fracturing assembly of claim 1, wherein the coupling passage cross-section defines an outer manifold coupling perimeter having opposite manifold coupling portions, wherein the first inlet passage cross-section defines an outer inlet perimeter having opposite inlet portions, wherein the first inlet passage intersects the manifold coupling passage such that one of the opposite inlet portions of the first inlet passage substantially coincides with a first manifold coupling portion of the opposite manifold coupling portions, wherein the second inlet passage cross-section defines an outer inlet perimeter having opposite inlet portions, and wherein the second inlet passage intersects the manifold coupling passage such that one of the opposite inlet portions of the second inlet passage substantially coincides with a second manifold coupling portion of the opposite manifold coupling portions.

6. The assembly of claim 1, wherein the first inlet axis and the second inlet axis lie in a common plane but are not parallel relative to one another.

7. The fracturing assembly of claim 1, wherein the first inlet axis and the second inlet axis are skewed relative to one another.

8. The fracturing assembly of claim 1, wherein a manifold coupling cross-section of the manifold coupling is positioned perpendicular to the manifold axis and at least partially defines two pairs of opposing sides, and wherein the first inlet axis and the second inlet axis are oblique with respect to one or more of the two pairs of opposing sides.

9. The fracturing assembly of claim 1, further comprising a first coupling flange connecting the first inlet manifold to the manifold coupling, the manifold coupling including a first coupling recess in which the first coupling flange is at least partially received, and a first coupling seal positioned to provide a fluid-tight seal between the first coupling flange and the first coupling recess.

10. The fracturing assembly of claim 9, wherein one or more of the first coupling flange or the first coupling recess has a substantially circular cross-section perpendicular to the first inlet axis.

11. The fracturing assembly of claim 9, further comprising a second coupling flange connecting the second inlet manifold to the manifold coupling, the manifold coupling including a second coupling recess in which the second coupling flange is at least partially received, and a second coupling seal positioned to provide a fluid-tight seal between the second coupling flange and the second coupling recess.

12. The fracturing assembly of claim 11, wherein one or more of the second coupling flange or the second coupling recess has a substantially circular cross-section substantially perpendicular to the second inlet axis.

13. The fracturing assembly of claim 11, wherein the manifold passage has a substantially circular cross-section and substantially perpendicular to the manifold axis.

14. The fracturing assembly of claim 1, wherein one or more of:

the first inlet passage cross-section is substantially circular and substantially perpendicular to the first inlet axis, or the second inlet passage cross-section is substantially circular and substantially perpendicular to the second inlet axis.

15. The fracturing assembly of claim 1, wherein the manifold coupling comprises three pairs of opposing sides substantially defining a rectangular prism, the three pairs of opposing sides comprising:

a first pair of opposing sides through which the manifold passage flows; and a second pair of opposing sides substantially perpendicular relative to the first pair of opposing sides, the first inlet passage extending from a first one of the second pair of opposing sides to the manifold passage and the second inlet passage extending from a second one of the second pair of opposing sides to the manifold passage.

16. A method to enhance fluid flow between a plurality of pumps and a subsurface formation, the method comprising:

connecting a plurality of pumps to a manifold assembly comprising a manifold passage;

providing a first fluid flow between a first fluid output of a first pump of the plurality of pumps and a first inlet passage of the manifold assembly to provide fluid flow between the first pump and the subsurface formation; and providing a second fluid flow between a second fluid output of a second pump of the plurality of pumps and a second inlet passage of the manifold assembly to provide fluid flow between the second pump and the subsurface formation, wherein a position of the first inlet passage relative to the second inlet passage causes the fluid to swirl in the manifold passage.

17. The method of claim 16, wherein the first inlet passage is connected to a first inlet manifold and positioned to provide fluid flow between the first fluid output and the manifold passage, the first inlet passage having a first inlet passage cross-section at least partially defining a first inlet axis extending transverse relative to the manifold passage, and
the second inlet passage is connected to a second inlet manifold and positioned to provide fluid flow between the second fluid output and the manifold passage, the second inlet passage having a second inlet passage cross-section at least partially defining a second inlet axis extending transverse relative to the manifold axis and not being co-linear with the first inlet axis.

18. The method of claim 17, wherein the first inlet axis and the second inlet axis lie in a plane perpendicular to the manifold axis.

19. The method of claim 17, wherein the first inlet axis and the second inlet axis are parallel and offset relative to one another.

20. The method of claim 17, further comprising: providing a manifold coupling passage having a coupling passage cross-section defining one or more of a coupling passage shape or a coupling passage size, and wherein the coupling passage cross-section defines an outer manifold coupling perimeter having opposite manifold coupling portions, wherein the first inlet passage cross-section defines an outer inlet perimeter having opposite inlet portions, wherein the first inlet passage intersects the manifold coupling passage such that one of the opposite inlet portions of the first inlet passage substantially coincides with a first manifold coupling portion of the opposite manifold coupling portions, wherein the second inlet passage cross-section defines an outer inlet perimeter having opposite inlet portions, and wherein the second inlet passage intersects the manifold coupling passage such that one of the opposite inlet portions of the second inlet passage substantially coincides with a second manifold coupling portion of the opposite manifold coupling portions.

21. The method of claim 17, wherein the first inlet axis and the second inlet axis lie in a common plane but are not parallel relative to one another.

22. The method of claim 17, wherein the first inlet axis and the second inlet axis are skew relative to one another.

23. A method to enhance suspension of proppants in a fluid, the method comprising:
connecting a plurality of pumps to a manifold assembly comprising a manifold section at least partially defining a manifold passage, thereby to provide flow of fluid between the plurality of pumps and the manifold assembly, the fluid including proppants; and
providing a first fluid flow between a first fluid output of a first pump of the plurality of pumps and a first inlet passage of the manifold assembly to enter the manifold section; and
providing a second fluid flow between a second fluid output of a second pump of the plurality of pumps and a second inlet passage of the manifold assembly to enter the manifold section,
wherein a position of the first inlet passage relative to the second inlet passage causes the fluid to swirl in the manifold passage.

24. The method of claim 23, wherein
the first inlet passage is connected to a first inlet manifold and positioned to provide fluid flow between the first fluid output and the manifold passage, the first inlet passage having a first inlet passage cross-section at least partially defining a first inlet axis extending transverse relative to the manifold passage, and
a second inlet passage is connected to a second inlet manifold and positioned to provide fluid flow between the second fluid output and the manifold passage, the second inlet passage having a second inlet passage cross-section at least partially defining a second inlet axis extending transverse relative to the manifold axis and not being co-linear with the first inlet axis.

25. A method to enhance drainage of fluid from a manifold assembly, the method comprising:
providing a manifold assembly, the manifold assembly including:
a manifold section comprising a manifold passage having a manifold cross-section and a manifold axis extending longitudinally along a length of the manifold section, and
a manifold coupling comprising:
a first inlet passage connected to a first inlet manifold and positioned to provide fluid flow between a first fluid output and the manifold passage,
a second inlet passage connected to a second inlet manifold and positioned to provide fluid flow between a second fluid output and the manifold passage, and
a manifold coupling passage having a coupling passage cross-section defining one or more of a coupling passage shape or a coupling passage size, the coupling passage cross-section defining an outer manifold coupling perimeter having an upper manifold coupling portion and a lower manifold coupling portion opposite the upper manifold coupling portion, and the second inlet passage intersecting the manifold coupling passage such that the lower inlet portion of the second inlet passage substantially coincides with the lower manifold coupling portion; and
draining fluid from the manifold section.

* * * * *